(12) United States Patent
Kim et al.

(10) Patent No.: US 11,315,521 B2
(45) Date of Patent: Apr. 26, 2022

(54) ELECTRONIC DEVICE AND METHOD FOR BRIGHTNESS CONTROL OF ELECTRONIC DEVICE

(71) Applicant: SAMSUNG ELECTRONICS CO., LTD., Suwon-si (KR)

(72) Inventors: Jun Young Kim, Suwon-si (KR); Jung Sik Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/648,512

(22) PCT Filed: Aug. 8, 2018

(86) PCT No.: PCT/KR2018/009031
§ 371 (c)(1),
(2) Date: Mar. 18, 2020

(87) PCT Pub. No.: WO2019/059524
PCT Pub. Date: Mar. 28, 2019

(65) Prior Publication Data
US 2020/0286414 A1 Sep. 10, 2020

(30) Foreign Application Priority Data

Sep. 21, 2017 (KR) .................. 10-2017-0121610
Feb. 1, 2018 (KR) .................. 10-2018-0012780

(51) Int. Cl.
*G09G 5/10* (2006.01)
*G09G 3/00* (2006.01)

(52) U.S. Cl.
CPC .............. *G09G 5/10* (2013.01); *G09G 3/006* (2013.01); *G09G 3/00* (2013.01);
(Continued)

(58) Field of Classification Search
CPC ........... G09G 3/006; G09G 3/20; G09G 3/00; G09G 5/10; G09G 5/14; G09G 2320/0633;
(Continued)

(56) References Cited

U.S. PATENT DOCUMENTS 7,561,127 B2   7/2009  Mori et al.
8,194,007 B2   6/2012  Mori et al.
(Continued)

FOREIGN PATENT DOCUMENTS

EP   0 911 799   4/1999
EP   2 713 359   4/2014
(Continued)

OTHER PUBLICATIONS

International Search Report for PCT/KR2018/009031 dated Nov. 16, 2018, 4 pages.
(Continued)

*Primary Examiner* — Brent D Castiaux
(74) *Attorney, Agent, or Firm* — Nixon & Vanderhye, P.C.

(57) ABSTRACT

An electronic device according to one embodiment disclosed in the present application comprises: a first surface; a second surface facing the first surface; a housing for encompassing a space between the first surface and the second surface; a display exposed through the first surface and including a plurality of pixels; applications outputted through the display; a memory for storing first data for identifying a designated part of the applications; a sensor for measuring second data related to a condition of the display; and a processor electrically connected to the display, the memory and the sensor. In addition, various embodiments identified through the specification are possible.

13 Claims, 14 Drawing Sheets

(52) U.S. Cl.
CPC .............. *G09G 2320/0633* (2013.01); *G09G 2330/12* (2013.01); *G09G 2360/147* (2013.01)

(58) Field of Classification Search
CPC ..... G09G 2320/046; G09G 2320/0626; G09G 2320/041; G09G 2330/12; G09G 2360/147; G09G 2360/144; G09G 2354/00; G09G 2320/0242; G09G 2320/0257; G09G 2320/043; G06F 11/30; G06F 11/3058
See application file for complete search history.

(56) References Cited

U.S. PATENT DOCUMENTS

| | | | |
|---|---|---|---|
| 8,508,441 B2 | 8/2013 | Kimura et al. | |
| 9,424,804 B2 | 8/2016 | Jung et al. | |
| 9,552,534 B2 | 1/2017 | Jang et al. | |
| 9,714,977 B2 | 7/2017 | Jung et al. | |
| 9,997,104 B2 | 6/2018 | Zhang et al. | |
| 10,354,165 B2 | 7/2019 | Jang et al. | |
| 2005/0093850 A1* | 5/2005 | Mori | G09G 3/007 345/204 |
| 2006/0055335 A1 | 3/2006 | Shingai et al. | |
| 2008/0204596 A1 | 8/2008 | Koh | |
| 2009/0033591 A1* | 2/2009 | Ikeya | G09G 3/3406 345/60 |
| 2010/0265228 A1* | 10/2010 | Kimura | G09G 3/3233 345/207 |
| 2013/0141351 A1* | 6/2013 | Aisaka | G09G 5/10 345/173 |
| 2014/0092119 A1 | 4/2014 | Jung et al. | |
| 2015/0138261 A1* | 5/2015 | Nakayama | G09G 3/3685 345/694 |
| 2016/0293102 A1* | 10/2016 | Chaji | G09G 3/3208 |
| 2016/0351115 A1* | 12/2016 | Bang | G09G 3/3208 |
| 2016/0379584 A1* | 12/2016 | Onishi | G09G 3/2025 345/691 |
| 2017/0076661 A1 | 3/2017 | Zhang et al. | |

FOREIGN PATENT DOCUMENTS

| | | |
|---|---|---|
| JP | 2008-197675 | 8/2008 |
| JP | 2010-250171 | 11/2010 |
| KR | 10-2008-0078503 | 8/2008 |
| KR | 10-2015-0029174 | 3/2015 |
| KR | 10-2016-0133953 | 11/2016 |
| KR | 10-1676774 | 11/2016 |
| KR | 10-2017-0012836 | 2/2017 |

OTHER PUBLICATIONS

Written Opinion of the ISA for PCT/KR2018/009031 dated Nov. 16, 2018, 7 pages.
Extended European Search Report dated Aug. 13, 2020 in counterpart EP Application No. 18859833.8.

* cited by examiner

ELECTRONIC DEVICE AND METHOD FOR BRIGHTNESS CONTROL OF ELECTRONIC DEVICE

This application is the U.S. national phase of International Application No. PCT/KR2018/009031 filed Aug. 8, 2018 which designated the U.S. and claims priority to KR Patent Application No. 10-2017-0121610 filed Sep. 21, 2017 and KR Patent Application No. 10-2018-0012780 filed Feb. 1, 2018, the entire contents of each of which are hereby incorporated by reference.

TECHNICAL FIELD

The present disclosure relates to a technology for preventing a pixel from deterioration.

BACKGROUND ART

An electronic device, which is equipped with a display, such as a smartphone, a wearable device, or the like has been widely supplied as mobile communication technologies develop. The electronic device may execute various functions such as a photo or video capturing function, a playback function of a music file or a video file, a game function, an Internet function, and the like through the display.

For the purpose of outputting an interface associated with the functions, the display may include a plurality of pixels. A plurality of sub pixels may be included in each of the pixels. For example, a red sub pixel, a green sub pixel, and a blue sub pixel may be included in each of the pixels. The display may emit each of the sub pixels to output a picture, a video, or the like.

The lifetimes of the sub pixels may be different from each other. For example, the lifetime of a blue sub pixel may be shorter than the lifetime of a red sub pixel. Therefore, as time goes on, the brightness of the blue sub pixel may decrease. Since the brightness of the blue sub-pixel is reduced, the screen output through the display may become reddish.

In addition, in the case where an image fixed in some area of the display is continuously output, an after-image may occur due to a difference in the life time between the sub pixels. For example, a user may execute a chat application for a long time through an electronic device. In the execution screen of the chat application, the chat window may be a fixed image. The display may emit sub pixels corresponding to the chat window for a long time. However, as described above, since the lifetimes of the sub pixels are different from each other, the brightness of some sub-pixels may be reduced. As a result, an after-image of a chat window shape may appear on the display screen.

SUMMARY

Aspects of the present disclosure are to provide an electronic device for solving the above-described problem and problems brought up in this specification.

In accordance with an aspect of the present disclosure, an electronic device may include a housing surrounding a first surface, a second surface opposite to the first surface, and a space between the first surface and the second surface, a display exposed through the first surface and including a plurality of pixels, a memory storing applications output through the display and first data for identifying a specified part of the applications, a sensor measuring second data associated with a condition of the display, and a processor electrically connected to the display, the memory, and the sensor. The processor may be configured to execute one of the applications in response to a user input, to determine whether the executed application is included in the specified part, based on the first data, when the determination result indicates that the executed application is included in the specified part, to cause the sensor to measure the second data, and to adjust a brightness of each of the pixels based on the measured second data.

In addition, an electronic device according to an embodiment of the present disclosure may include a housing surrounding a first surface, a second surface opposite to the first surface, and a space between the first surface and the second surface, a display exposed through the first surface and including a plurality of pixels, a sensor measuring data associated with a condition of the display, and a processor electrically connected to the display and the sensor. The processor may be configured to determine whether a fixed image is present on a screen output through the display, to cause the sensor to measure the data when the determination result indicates that the fixed image is present, and to adjust a brightness of each of pixels corresponding to the fixed image, based on the measured data.

In addition, a display controlling method according to an embodiment of the present disclosure may include executing one of applications stored in a memory in response to a user input, determining whether the executed application is included in the specified part, based on first data for identifying a specified part of the applications, causing a sensor to measure second data associated with a condition of the display when the determination result indicates that the executed application is included in the specified part, and adjusting a brightness of each of pixels included in the display, based on the measured second data.

In addition, an electronic device according to an embodiment of the present disclosure may include a display, a memory storing one or more pieces of identification information corresponding to one or more applications classified as a specified group based on how much the display 120 deteriorates, and a processor. The processor may be configured to verify an execution of an application based at least on an input for the display, displaying content corresponding to the application through the display set to a first brightness value when identification information of the application does not correspond to the one or more pieces of identification information, and displaying the content corresponding to the application through the display set to a second brightness value lower than the first brightness when the identification information of the application corresponds to the one or more pieces of identification information.

According to various embodiments of the present disclosure, the deterioration of the pixel may be prevented.

Besides, a variety of effects directly or indirectly understood through this disclosure may be provided.

DETAILED DESCRIPTION OF EXAMPLE EMBODIMENTS

Figure 1:
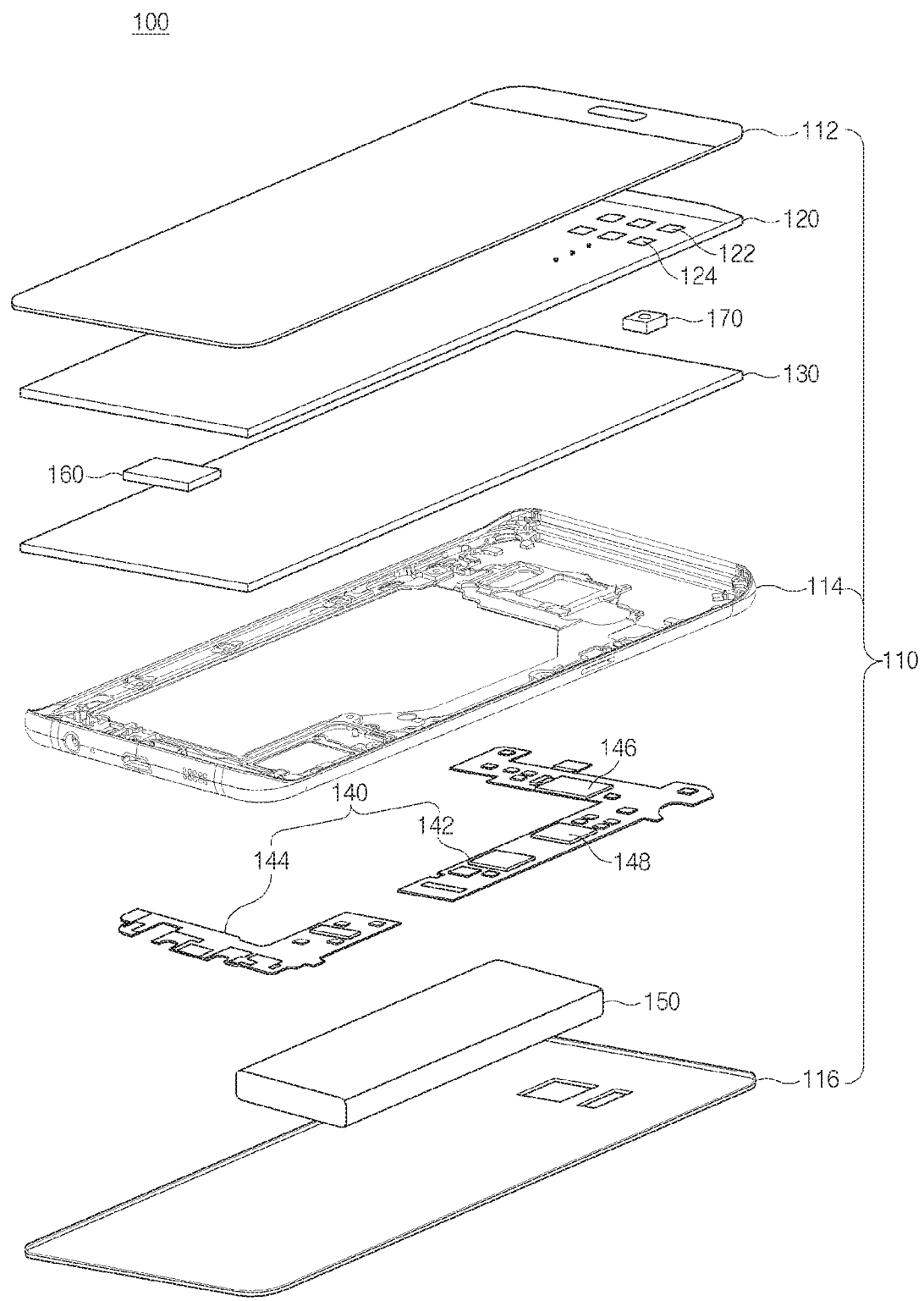
FIG. 1 illustrates an exploded perspective view of an electronic device according to an embodiment.

FIG. 1 illustrates an exploded perspective view of an electronic device according to an embodiment.

Referring to FIG. 1, an electronic device 100 may include a housing 110, a display 120, a shield layer 130, a printed circuit board (PCB) 140, a battery 150, and a sensor 160. According to an embodiment, the electronic device 100 may be implemented without some of the components illustrated in FIG. 1 or may be implemented to further include another component not illustrated in FIG. 1. In addition, the stacking order of the components included in the electronic device 100 may be different from the stacking order shown in FIG. 1.

The housing 110 may form an outer appearance of the electronic device 100. For example, the housing 110 may include a first surface, a second surface facing an opposite direction of the first surface, and a side surface surrounding a space between the first surface and the second surface. In the present disclosure, the first surface, the second surface, and the side surface may be referred to as a "cover glass" 112, a "rear cover" 116, and a "side housing" 114, respectively.

The cover glass 112 may transmit light generated by the display 120. Also, a user may touch the cover glass 112 by using a portion (e.g., a finger) of his/her body to perform a touch (including a contact using an electronic pen). For example, the cover glass 112 may be formed of tempered glass, reinforced plastics, or a flexible polymer material. According to an embodiment, the cover glass 112 may be also referred to as a "glass window".

The side housing 114 may protect the components included in the electronic device 100. For example, the display 120, the shield layer 130, the PCB 140, the battery 150, or the like may be contained inside the side housing 114, and the side housing 114 may protect the components from an external shock.

The side housing 114 may include an area not exposed to the outside of the electronic device 100 and an area exposed to the outside of the electronic device 100. For example, the area not exposed to the outside of the electronic device 100 may be formed of a non-conductive material. The area exposed to the outside of the electronic device 100 may be formed of metal. The exposed area formed of metal may be also referred to as a "metal bezel". According to an embodiment, at least part of the metal bezel may be used as an antenna element for transmitting and receiving a signal of a specified frequency band.

The rear cover 116 may be coupled to a rear surface (i.e., below the side housing 114) of the electronic device 100. The rear cover 116 may be formed of tempered glass, plastic, and/or metal. According to an embodiment, the rear cover 116 may be integrally implemented with the side housing 114 or may be implemented to be removable by a user.

The display 120 may be disposed under the cover glass 112. The display 120 may be electrically connected to the PCB 140 to output content (e.g., a text, an image, a video, an icon, a widget, a symbol, or the like). In addition, the display 120 may receive a touch input (e.g., a touch, a gesture, a hovering, or the like) from the user. According to an embodiment, a plurality of pixels 122 and 124 may be disposed on the display 120.

The shield layer 130 may be interposed between the display 120 and the side housing 114. The shield layer 130 may shield electromagnetic waves generated between the display 120 and the PCB 140 to prevent electro-magnetic interference between the display 120 and the PCB 140.

According to an embodiment, the shield layer 130 may include a thin sheet, or a plate that is formed of copper (Cu) or graphite. In the case where the shield layer 130 is formed of copper (Cu) or graphite, the components included in the electronic device 100 may be grounded to the shield layer 130.

The PCB 140 (or a printed circuit board) may mount various types of components, elements, printed circuits, or the like of the electronic device 100. For example, the PCB 140 may mount a memory 146, a processor 148 (e.g., application processor (AP) and/or a communication processor (CP)). In the present disclosure, the PCB 140 may be referred to as a "main board, or printed board assembly (PBA)".

According to an embodiment, the PCB 140 may include a first PCB 142 and a second PCB 144. The first PCB 142 may be referred to a "main PCB" on which the processor 148 is mounted. The second PCB 144 may be referred to a "sub PCB" connected to the main PCB.

The battery 150 may convert chemical energy and electrical energy bidirectionally. For example, the battery 150 may convert chemical energy into electrical energy and may supply the converted electrical energy to the display 120 and various elements or modules mounted on the PCB 140. Alternatively, the battery 150 may convert and store electrical energy from the outside into chemical energy. According to an embodiment, a power management module for managing charging and discharging of the battery 150 may be included in the PCB 140.

The memory 146 may store applications output through the display 120 and first data for identifying a specified part of the applications. In the present disclosure, a specified part (or a specified application) may mean an application including a fixed image in a screen on which the application is output. The first data may be data for identifying the specified application and may include, for example, an ID (or identifier), a name, or the like of the specified application.

The sensor 160 may be electrically connected to the display 120. The sensor 160 may measure second data associated with the condition of the display 120. For example, the sensor 160 may measure the temperature, driving time, or the like of the display 120.

The processor 148 may be electrically connected to the display 120 and the sensor 160. The processor 148 may execute one of applications in response to a user input (e.g., a user's touch). When an application is executed, the processor 148 may determine whether the application executed based on the first data is included in the specified application. For example, in a state where the ID of a chat application is included in the first data, the user may execute the chat application. In this case, since the ID of the chat application is included in the first data, the electronic device 100 may determine that the chat application is included in the specified application.

When the executed application is included in the specified application, the processor 148 may allow the sensor 160 to measure the second data. The processor 148 may determine whether the measured second data is not less than a specified value. When it is determined that the second data is not less than the specified value, the processor 148 may adjust the brightness of each of pixels 122 and 124. For example, when the temperature of the display 120 is not less than 50° C. in a state where the chat application is executed, the processor 148 may decrease the brightness of each of the pixels 122 and 124.

According to an embodiment, the processor 148 may adjust DC voltage applied to the pixels 122 and 124 to decrease the brightness of each of the pixels 122 and 124. For example, the processor 148 may decrease a first voltage (e.g., ELVDD) applied to one end of each of the pixels 122 and 124 and a second voltage (e.g., ELVSS) applied to the other end of each of the pixels 122 and 124. Since the DC voltage applied to the pixels 122 and 124 decreases, the brightness of each of the pixels 122 and 124 may decrease.

An illuminance sensor 170 may measure an external illuminance value. For example, when the user goes outdoors while gripping the electronic device 100, an illuminance value may increase. On the other hand, when the user comes indoors while gripping the electronic device 100, the illuminance value may decrease.

In the present disclosure, details given with reference to FIG. 1 may be identically applied to components that have the same reference marks as those of the electronic device 100 described with reference to FIG. 1.

Figure 2A:
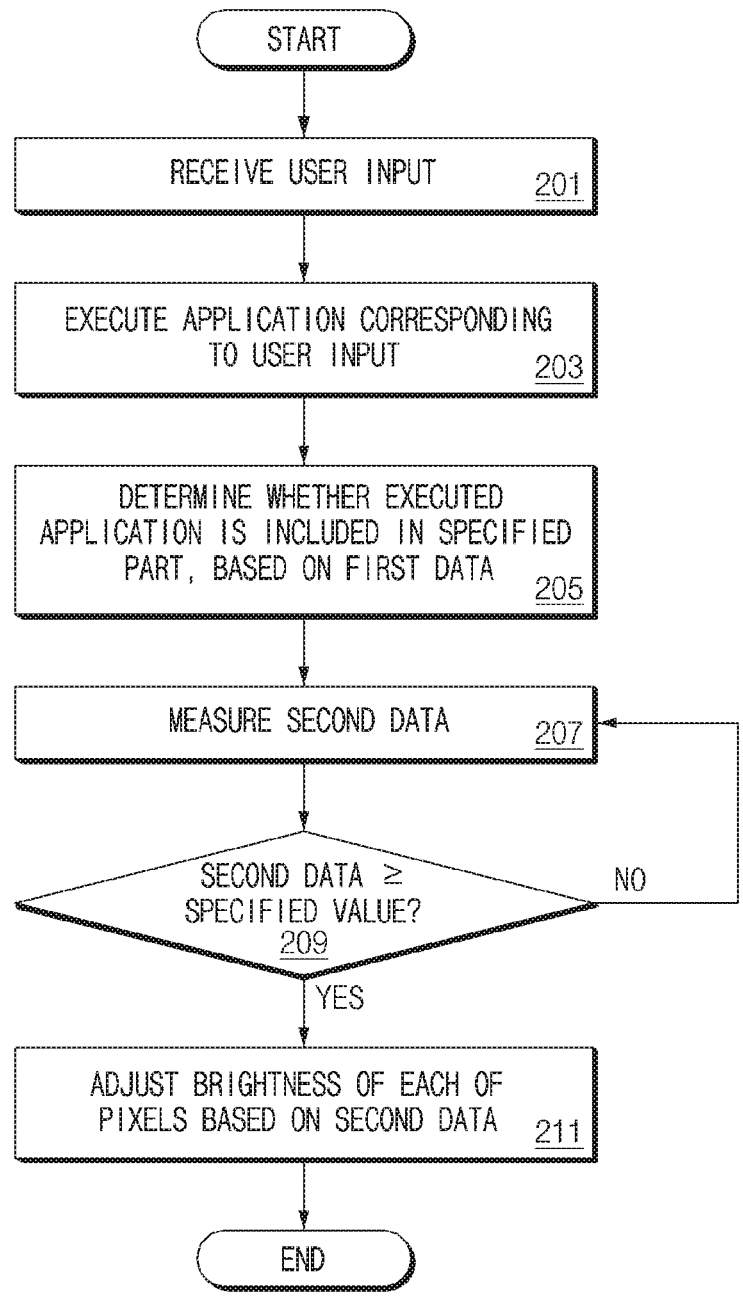
FIG. 2A illustrates a flowchart of an electronic device, according to an embodiment.

FIG. 2A illustrates a flowchart of an electronic device, according to an embodiment. FIG. 2A is a diagram associated with an embodiment to adjust the brightness of each of the pixels 122 and 124 based on an application executed in the electronic device 100.

Referring to FIG. 2A, in operation 201, the electronic device 100 may receive a user input. For example, the user input may include a touch of the display 120, a voice input, or the like.

In operation 203, the electronic device 100 may execute an application corresponding to the user input. For example, a plurality of application icons may be output through the display 120. When a user touches a chat application icon among the icons, the electronic device 100 may execute the chat application. In another embodiment, the user may execute the application through a voice input. For example, when the user utters "How is the weather today?", the electronic device 100 may execute a weather application.

In operation 205, the electronic device 100 may determine whether the application executed through operation 203 is included in a specified application (or specified part), based on first data. In the present disclosure, the first data may mean data (or a table) that allows the electronic device 100 to identify a specified application (or specified part).

TABLE 1

|  | Application ID | Application |
|---|---|---|
| Specified application | AID 1 | Facebook messenger, KakaoTalk |
|  | AID 2 | Google, Naver, |
|  | AID 3 | YouTube |
| Unspecified application | AID 4 | Airbnb |

Table 1 may indicate the first data for identifying the specified application, according to an embodiment. Referring to Table 1, the electronic device 100 may execute a Facebook messenger in response to the user input. The electronic device 100 may verify the application ID of the Facebook messenger. When it is verified that the application ID of the Facebook messenger is 'AID 1', the application ID of the Facebook messenger may correspond to the specified application. Accordingly, the electronic device 100 may determine that the Facebook messenger is included in the specified application. When the executed application is included in the specified application, the electronic device 100 may perform operation 207.

In operation 207, the electronic device 100 may measure second data associated with the condition of the display 120. For example, the electronic device 100 may measure the temperature of the display 120, the driving time of the display 120, or the like.

In operation 209, the electronic device 100 may compare the measured second data with a specified value. For example, the electronic device 100 may determine whether the temperature of the display 120 is not less than 50° C. or whether the driving time of the display 120 is not less than 2 hours. When it is determined that the measured data is not less than the specified value, the electronic device 100 may perform operation 211.

In operation 211, the electronic device 100 may adjust the brightness of each of the pixels 122 and 124 based on the second data. For example, when the temperature of the display 120 is not less than 50° C., the electronic device 100 may reduce the brightness each of the pixels 122 and 124 from 420 nit to 180 nit. In another embodiment, when the driving time of the display 120 is not less than 2 hours, the electronic device 100 may reduce the brightness each of the pixels 122 and 124 from 420 nit to 180 nit.

Although not illustrated in FIG. 2A, when the operation of an application is interrupted (or when an application is turned off), the electronic device 100 may increase the brightness each of the pixels 122 and 124. For example, when the temperature of the display 120 is not less than 50° C. in a state where a Facebook messenger is executed, the electronic device 100 may decrease the brightness each of the pixels 122 and 124 from 420 nit to 180 nit. When the user interrupts the operation of the Facebook messenger in a state where the brightness each of the pixels 122 and 124 decreases, the electronic device 100 may increase the brightness each of the pixels 122 and 124 to 420 nit.

Figure 2B:
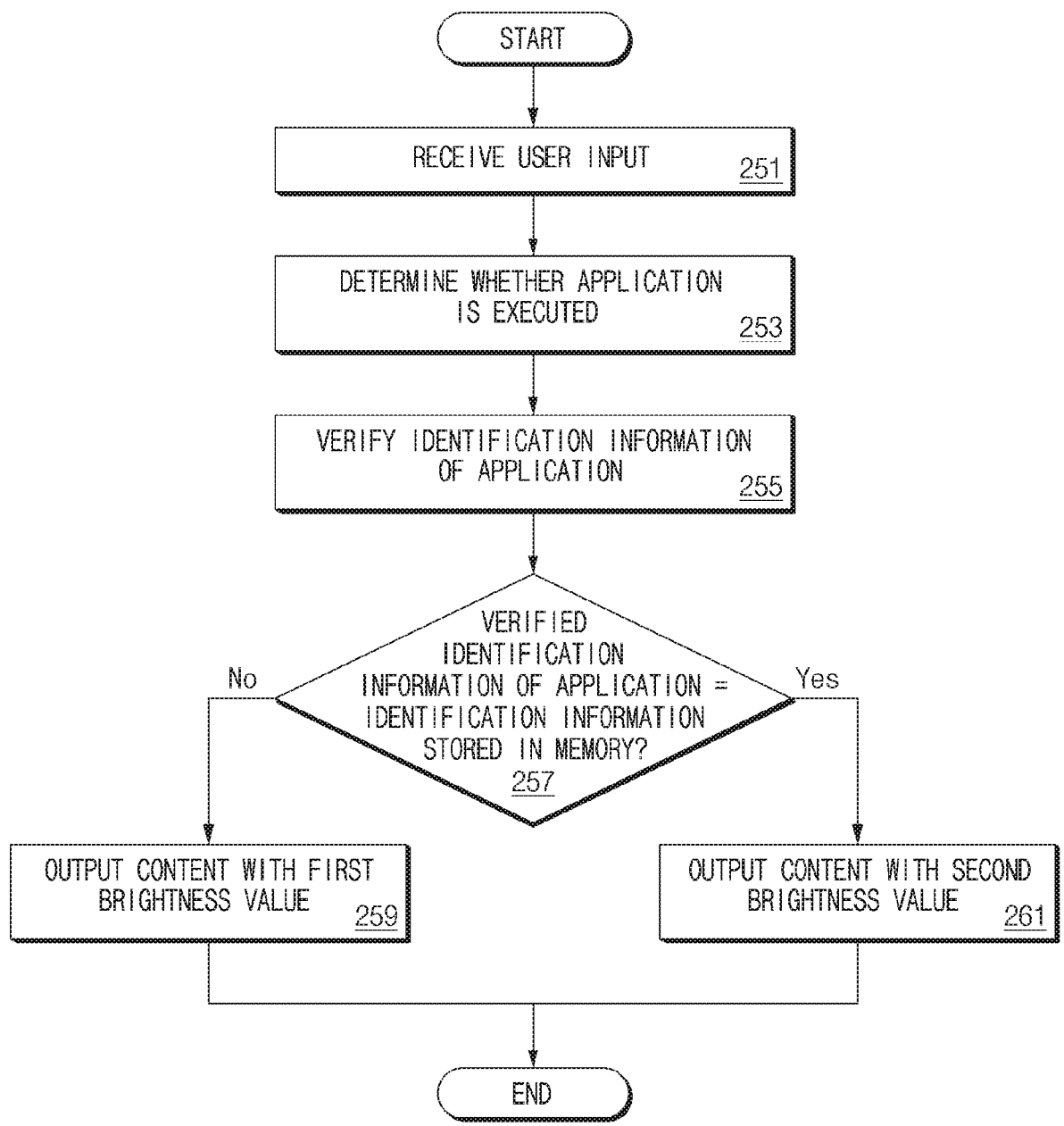
FIG. 2B illustrates an operation flowchart of an electronic device, according to another embodiment.

FIG. 2B illustrates an operation flowchart of an electronic device, according to another embodiment.

Referring to FIG. 2B, in operation 251, the electronic device 100 may receive a user input. For example, the user input may include a touch of the display 120, a voice input, or the like.

In operation 253, the electronic device 100 may determine whether an application corresponding to the user input has been executed. For example, in the case where a user has executed a chat application, the electronic device 100 may determine whether the chat application has been executed.

In operation 255, the electronic device 100 may verify the identification information of an application. In the present disclosure, the identification information may mean data (or a table) for identifying an application classified as a specified group based on how much the display 120 deteriorates.

In operation 257, the electronic device 100 may determine whether the verified identification information of the application corresponds to identification information stored in a memory. For example, the electronic device 100 may determine whether the verified ID of the application is the same as an ID stored in the memory. When the verified identification information of the application does not correspond to the identification information stored in a memory, the electronic device 100 may perform operation 259. When the verified identification information of the application corresponds to the identification information stored in a memory, the electronic device 100 may perform operation 261.

In operation 259, the electronic device 100 may output content with a first brightness value. That is, since the verified application is not included in the specified group, the electronic device 100 may output the content with a specific brightness or more.

In operation 261, the electronic device 100 may output the content with a second brightness value. That is, since the verified application is included in the specified group, the electronic device 100 may output the content with a value less than a specific brightness for the purpose of preventing a display from deterioration.

Figure 3:
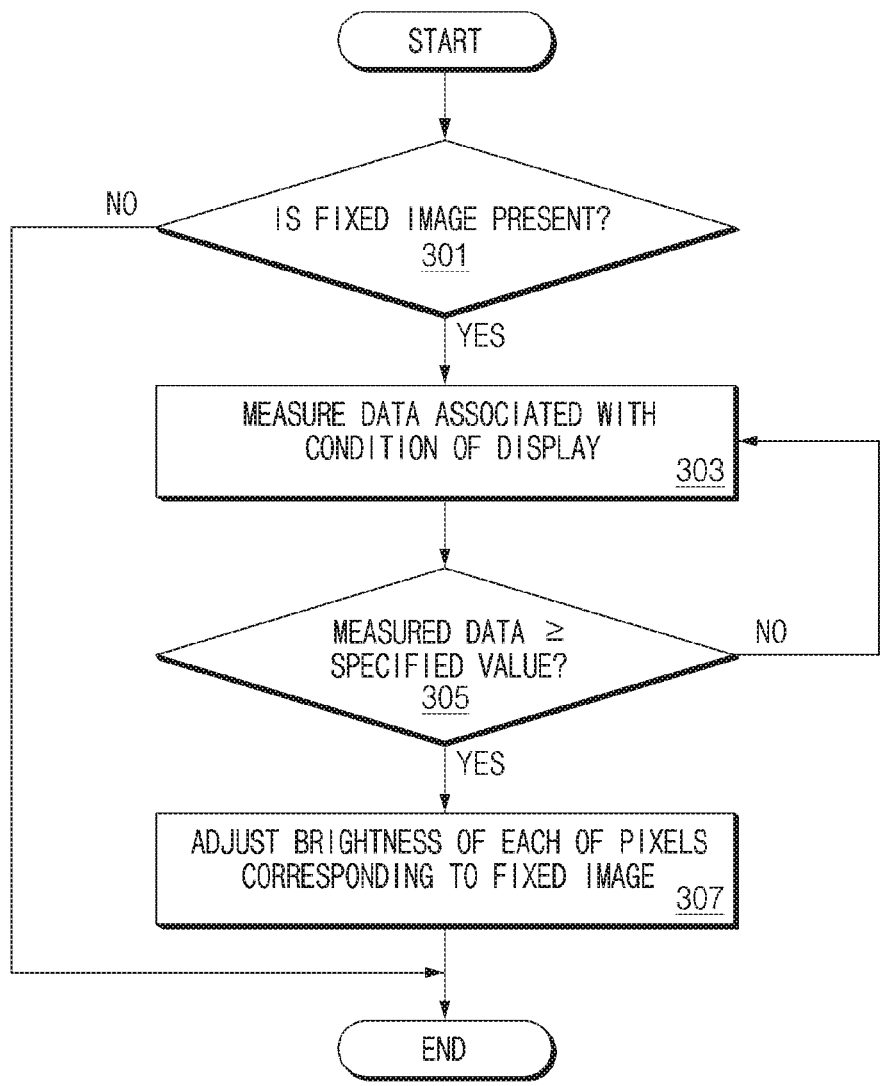
FIG. 3 illustrates an operation flowchart of an electronic device, according to another embodiment.

FIG. 3 illustrates an operation flowchart of an electronic device, according to another embodiment. FIG. 3 is a diagram associated with an embodiment to adjust the brightness of each of the pixels 122 and 124 based on whether a fixed image is present on a screen.

Referring to FIG. 3, in operation 301, the electronic device 100 may determine whether the fixed image is present on the screen output through the display 120. For example, the electronic device 100 may capture a plurality of screens and may compare the captured plurality of screens with each other to determine whether the fixed image is present. In the present disclosure, the fixed image may mean the same image continuously output through a partial area of the display 120.

According to an embodiment, the electronic device 100 may execute an application in response to a user input. The electronic device 100 may determine whether the fixed image is present on an application execution screen.

In operation 303, the electronic device 100 may measure data associated with the condition of the display 120. For example, the electronic device 100 may measure the temperature of the display 120, the driving time of the display 120, or the like.

In operation 305, the electronic device 100 may compare the measured data with a specified value. For example, the electronic device 100 may determine whether the temperature of the display 120 is not less than 50° C. In addition, the electronic device 100 may determine whether the driving time of the display 120 is not less than 2 hours. When it is determined that the measured data is not less than the specified value, the electronic device 100 may perform operation 307.

In operation 307, the electronic device 100 may adjust the brightness of each of the pixels 122 and 124 corresponding to the fixed image. For example, the fixed image may be output through the partial area of the display 120. In this case, the electronic device 100 may decrease the brightness of each of the pixels 122 and 124 disposed in the partial area. The brightness of each of the pixels 122 and 124 disposed in the remaining area of the display 120 may be maintained constantly regardless of the temperature of the display 120 or the driving time of the display 120.

The above-described order of operations is only an example, and the scope of the embodiment of the present disclosure is not limited in the specific order in which the electronic device 100 is performed. For example, unlike illustration of FIG. 3, the electronic device 100 may measure data associated with the condition of the display 120. In the case where the measured data is not less than a specified value, the electronic device 100 may determine whether the fixed image is present. When the fixed image is present, the electronic device 100 may adjust (or may decrease) the brightness of each of pixels corresponding to the fixed image. In other words, the electronic device 100 may perform operations in order of operation 303, operation 305, operation 301, and operation 307.

Figure 4:
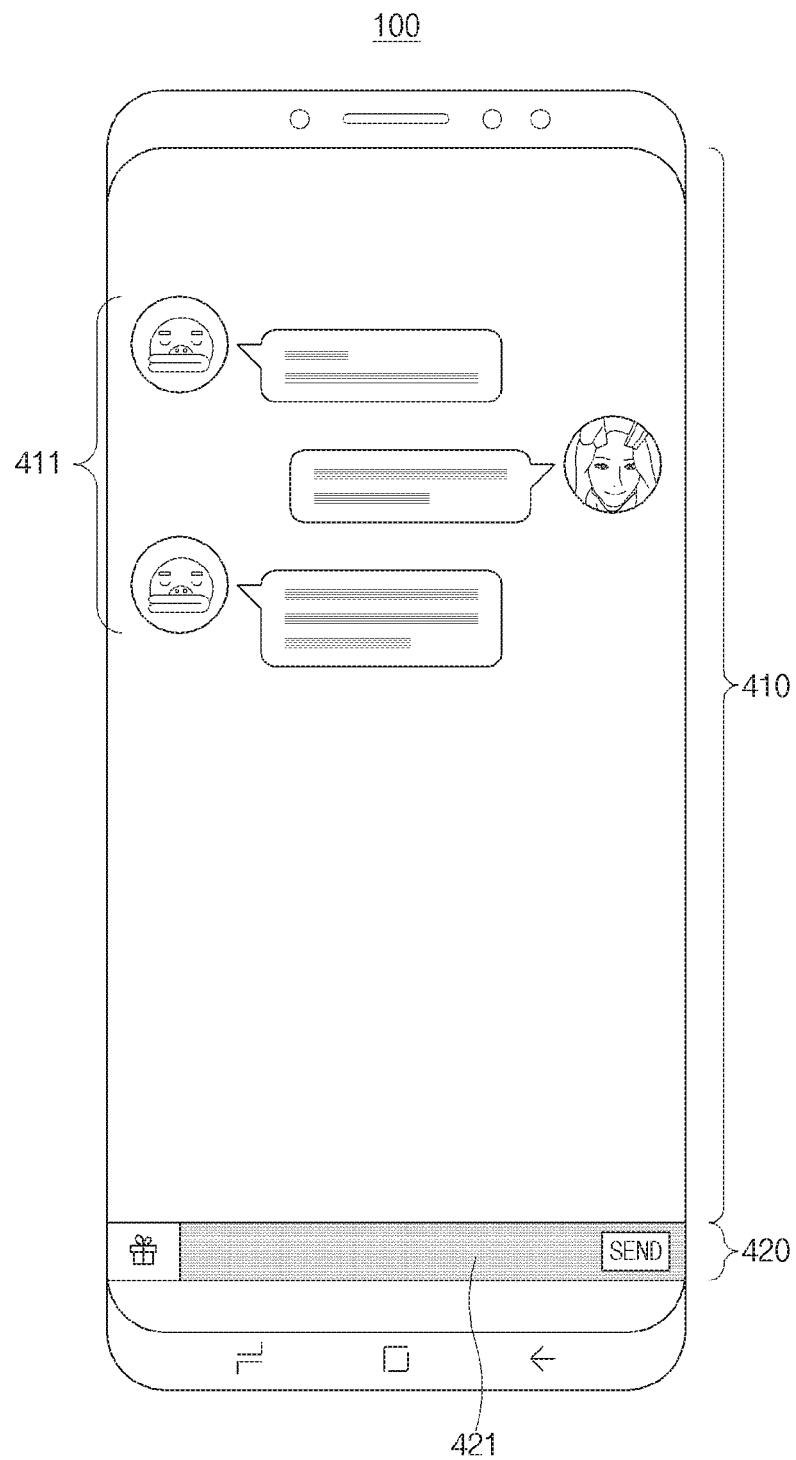
FIG. 4 illustrates an application execution screen, according to an embodiment.

FIG. 4 illustrates an application execution screen, according to an embodiment.

Referring to FIG. 4, the electronic device 100 may output an application execution screen. The application execution screen may include an image 411 continuously changing as time goes on and/or a fixed image 421. For example, the electronic device 100 may output the continuously changing image 411 through a first area 410. In addition, the electronic device 100 may output the fixed image 421 through a second area 420.

Since the fixed image 421 is output through the second area 420, the electronic device 100 may decrease the brightness of each of pixels disposed in the second area 420. According to an embodiment of the present disclosure, the brightness of each of pixels in the area in which the fixed image 421 is output may be reduced, and thus the pixels may be prevented from deterioration.

According to an embodiment, the location of the fixed image 421 may be changed depending on the executed application. For example, unlike illustration in FIG. 4, the fixed image 421 may be output to the first area 410, and the continuously changing image may be output to the second area 420. According to another embodiment, the application execution screen may not include the fixed image 421.

According to an embodiment, the electronic device 100 may output a screen including the fixed image regardless of whether an application is executed. For example, the electronic device 100 may output a home screen, a lock screen, or the like, and the fixed image may be included in the screens. In this case, the electronic device 100 may decrease the brightness of each of pixels corresponding to the fixed image.

Figure 5:
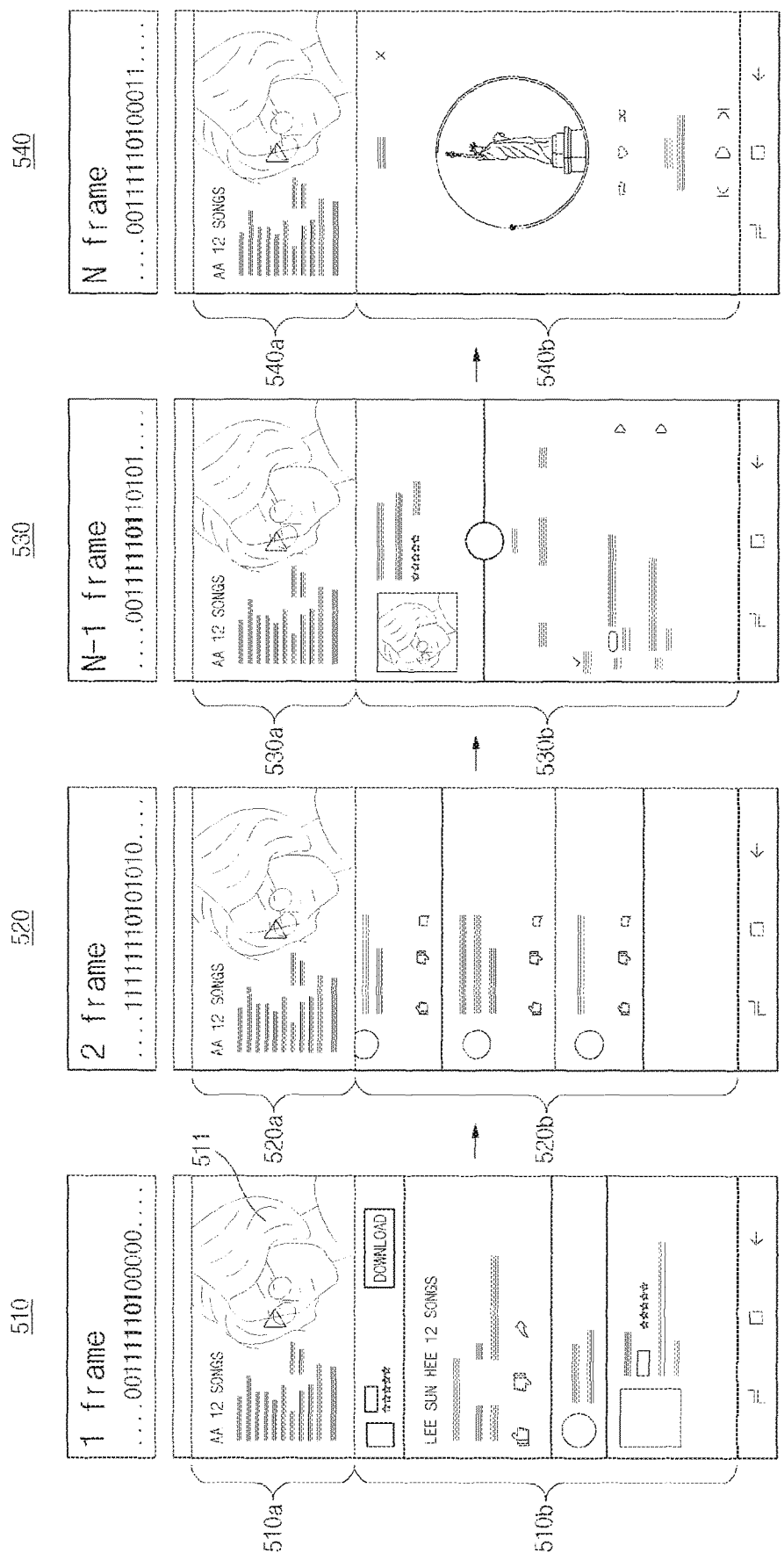
FIG. 5 illustrates a procedure in which an electronic device determines whether a fixed image is present, according to an embodiment.

FIG. 5 illustrates a procedure in which an electronic device determines whether a fixed image is present, according to an embodiment.

Referring to FIG. 5, the electronic device 100 may capture a plurality of screens 510, 520, 530, and 540 (or frames). The electronic device 100 may compare the captured plurality of screens 510, 520, 530, and 540 with each other to determine whether a fixed image is present. For example, the electronic device 100 may sequentially capture the first screen 510, the second screen 520, the third screen 530, and the fourth screen 540. At this time, the same image 511 may be output through a first area 510a of the first screen 510, a first area 520a of the second screen 520, a first area 530a of the third screen 530, and a first area 540a of the fourth screen 540. In the meantime, different images may be continuously output through a second area 510b of the first screen 510, a second area 520b of the second screen 520, a second area 530b of the third screen 530, and a second area 540b of the fourth screen 540. The different images may be changed depending on a user input or may be changed depending on the sequence of operations of an application.

The electronic device 100 may compare the plurality of screens 510, 520, 530, and 540 with each other to determine whether a fixed image is present. For example, the electronic device 100 may compare the first screen 510 with the second screen 520 and may compare the second screen 520 with the third screen 530. In addition, the electronic device 100 may compare the third screen 530 with the fourth screen 540. According to the comparison result, the same image 511 may be output to the first areas 510*a*, 520*a*, 530*a*, and 540*a* of the first to fourth screens 510 to 540. As such, the electronic device 100 may determine whether the fixed image is present in the first to fourth screens 510 to 540.

According to an embodiment, the number of screens that the electronic device 100 compares may be different from that shown in FIG. 5. For example, the electronic device 100 may capture at least 60 screens and may compare the captured screens to determine whether the fixed image is present.

According to an embodiment, the electronic device 100 may capture one of various screens and may repeat the operation during a specified time. The electronic device 100 may compare the screens captured during the specified time to determine whether the fixed image is present. For example, the electronic device 100 may capture one of 60 screens for one second. The electronic device 100 may repeat the operation of capturing screens for 60 seconds and may capture the total 60 screens. When the 60 screens are captured, the electronic device 100 may compare the captured 60 screens to determine whether the fixed image 511 is present.

According to an embodiment, in the case where the same data (or the same bit) is repeated at the same location in the screens 510, 520, 530, and 540, the electronic device 100 may determine that the fixed image 511 is present. For example, as illustrated in FIG. 5, when data "111101" is repeatedly output in the first areas 510*a*, 520*a*, 530*a*, and 540*a* of the first to fourth screens 510 to 540, the electronic device 100 may determine that the fixed image 511 is present.

When it is determined that the fixed image is present, the electronic device 100 may measure the temperature or the driving time of the display 120. When the measurement result indicates that the temperature or the driving time is not less than a specified value, the electronic device 100 may reduce the brightness of each of pixels corresponding to the first areas 510*a*, 520*a*, 530*a*, and 540*a* of the screens 510, 520, 530, and 540. Meanwhile, the electronic device 100 may maintain the brightness of pixels corresponding to second areas 510*b*, 520*b*, 530*b*, and 540*b* of the screens 510, 520, 530, and 540 until an application is terminated.

According to an embodiment of the present disclosure, an electronic device may include a housing surrounding a first surface, a second surface opposite to the first surface, and a space between the first surface and the second surface, a display exposed through the first surface and including a plurality of pixels, a memory storing applications output through the display and first data for identifying a specified part of the applications, a sensor measuring second data associated with a condition of the display, and a processor electrically connected to the display, the memory, and the sensor. The processor may be configured to execute one of the applications in response to a user input, to determine whether the executed application is included in the specified part, based on the first data, when the determination result indicates that the executed application is included in the specified part, to cause the sensor to measure the second data, and to adjust a brightness of each of the pixels based on the measured second data.

According to an embodiment of the present disclosure, the processor may be configured to cause the sensor to measure at least one of a temperature of the display and a driving time of the display.

According to an embodiment of the present disclosure, the processor may be configured to decrease the brightness of each of the pixels when the temperature of the display is not less than a specified value.

According to an embodiment of the present disclosure, the processor may be configured to decrease the brightness of each of the pixels when the driving time of the display is not less than a specified time.

According to an embodiment of the present disclosure, the processor may be configured to control a voltage applied to the pixels to adjust the brightness of each of the pixels.

According to an embodiment of the present disclosure, the specified part may correspond to first type applications including a fixed image on a screen output through the display, and the remaining applications other than the first type applications among the applications may correspond to second type applications.

According to an embodiment of the present disclosure, the first data may include an identifier of each of the applications, and the processor may be configured to determine whether the executed application is included in the first type applications, based on the identifier.

According to an embodiment of the present disclosure, the processor may be configured to adjust the brightness of each of the pixels corresponding to the fixed image, based on the measured second data.

According to an embodiment of the present disclosure, the processor may be configured to decrease the brightness of each of the pixels based on the measured second data, and, when the executed application is terminated, to increase the brightness of each of the pixels.

According to an embodiment of the present disclosure, an electronic device may include a housing surrounding a first surface, a second surface opposite to the first surface, and a space between the first surface and the second surface, a display exposed through the first surface and including a plurality of pixels, a sensor measuring data associated with a condition of the display, and a processor electrically connected to the display and the sensor. The processor may be configured to determine whether a fixed image is present on a screen output through the display, to cause the sensor to measure the data when the determination result indicates that the fixed image is present, and to adjust a brightness of each of pixels corresponding to the fixed image, based on the measured data.

According to an embodiment of the present disclosure, the processor may be configured to compare a plurality of screens output through the display and to determine that the fixed image is present, when the comparison result indicates that the same image is output to a specified area.

According to an embodiment of the present disclosure, the electronic device may further include a memory configured to store applications output through the display.

According to an embodiment of the present disclosure, the processor may be configured to execute one of the applications in response to a user input and to determine whether the fixed image is present on a screen on which the executed application is output.

According to an embodiment of the present disclosure, the processor may be configured to cause the sensor to measure at least one of a temperature of the display and a driving time of the display.

According to an embodiment of the present disclosure, the processor may be configured to decrease the brightness of each of the pixels when the temperature of the display is not less than a specified value.

According to an embodiment of the present disclosure, the processor may be configured to decrease the brightness of each of the pixels when the driving time of the display is not less than a specified time.

According to an embodiment of the present disclosure, a display controlling method may include executing one of applications stored in a memory in response to a user input, determining whether the executed application is included in the specified part, based on first data for identifying a specified part of the applications, causing a sensor to measure second data associated with a condition of the display when the determination result indicates that the executed application is included in the specified part, and adjusting a brightness of each of pixels included in the display, based on the measured second data.

According to an embodiment of the present disclosure, the causing of the sensor to measure second data associated with the condition of the display when the determination result indicates that the executed application is included in the specified part may include measuring at least one of a temperature of the display and a driving time of the display.

According to an embodiment of the present disclosure, the adjusting of the brightness of each of pixels included in the display based on the measured second data may include decreasing the brightness of each of the pixels when the temperature of the display is not less than a specified value.

According to an embodiment of the present disclosure, the adjusting of the brightness of each of pixels included in the display based on the measured second data may include decreasing the brightness of each of the pixels when the driving time of the display is not less than a specified time.

According to an embodiment of the present disclosure, an electronic device may include a display, a memory storing one or more pieces of identification information corresponding to one or more applications classified as a specified group based on how much the display 120 deteriorates, and a processor. The processor may be configured to verify an execution of an application based at least on an input for the display, displaying content corresponding to the application through the display set to a first brightness value when identification information of the application does not correspond to the one or more pieces of identification information, and displaying the content corresponding to the application through the display set to a second brightness value lower than the first brightness when the identification information of the application corresponds to the one or more pieces of identification information.

According to an embodiment of the present disclosure, the processor may be configured to verify temperature information associated with the electronic device when the identification information corresponds to the one or more pieces of identification information classified as the specified group and to adjust the second brightness value further based on the temperature information.

According to an embodiment of the present disclosure, the processor may be configured to verify usage time associated with the application when the identification information corresponds to the one or more pieces of identification information classified as the specified group and to adjust the second brightness value further based on the usage time.

According to an embodiment of the present disclosure, the processor may be configured to determine whether data for outputting an image in a partial area of the display is output during a specified frame and to determine whether a fixed image is present in a screen output through the display based on the determined result.

According to an embodiment of the present disclosure, an electronic device may include a housing surrounding a first surface, a second surface opposite to the first surface, and a space between the first surface and the second surface, a display exposed through the first surface, an illuminance sensor exposed through at least part of the display, and a processor electrically connected to the display and the illuminance sensor. The processor may be configured to measure an illuminance value through the illuminance sensor, to increase a brightness of the display so as to have a first brightness corresponding to the measured illuminance value, to decrease the brightness of the display to a second brightness darker than the first brightness when the display is driven with the first brightness during a specified time or more.

According to an embodiment of the present disclosure, the illuminance value may correspond to a first illuminance value. The processor may be configured to decrease the brightness of the display to a third brightness darker than the second brightness when a second illuminance value lower than the first illuminance value is measured through the illuminance sensor.

According to an embodiment of the present disclosure, the processor may be configured to maintain the brightness of the display as the first brightness during the specified time.

According to an embodiment of the present disclosure, an electronic device may include a housing surrounding a first surface, a second surface opposite to the first surface, and a space between the first surface and the second surface, a display exposed through the first surface, a memory storing applications output through the display, an illuminance sensor exposed through at least part of the display, and a processor electrically connected to the display, the memory, and the illuminance sensor. The processor may be configured to execute one of the applications in response to a user input, to measure an illuminance value through the illuminance sensor when the executed application is included in a specified part, and to decrease a brightness of the display when the measured illuminance value is not less than a specified value.

According to an embodiment of the present disclosure, an electronic device may include a housing surrounding a first surface, a second surface opposite to the first surface, and a space between the first surface and the second surface, a display exposed through the first surface, a first sensor exposed through at least part of the display and measuring an illuminance value, a second sensor connected to the display and measuring a temperature of the display, and a processor electrically connected to the display, the first sensor, and the second sensor. The processor may be configured to measure the illuminance value through the first sensor, to measure a temperature of the display through the second sensor, and to decrease a brightness of the display when the measured illuminance value and the measured temperature of the display are not less than a specified value.

Figure 6A:
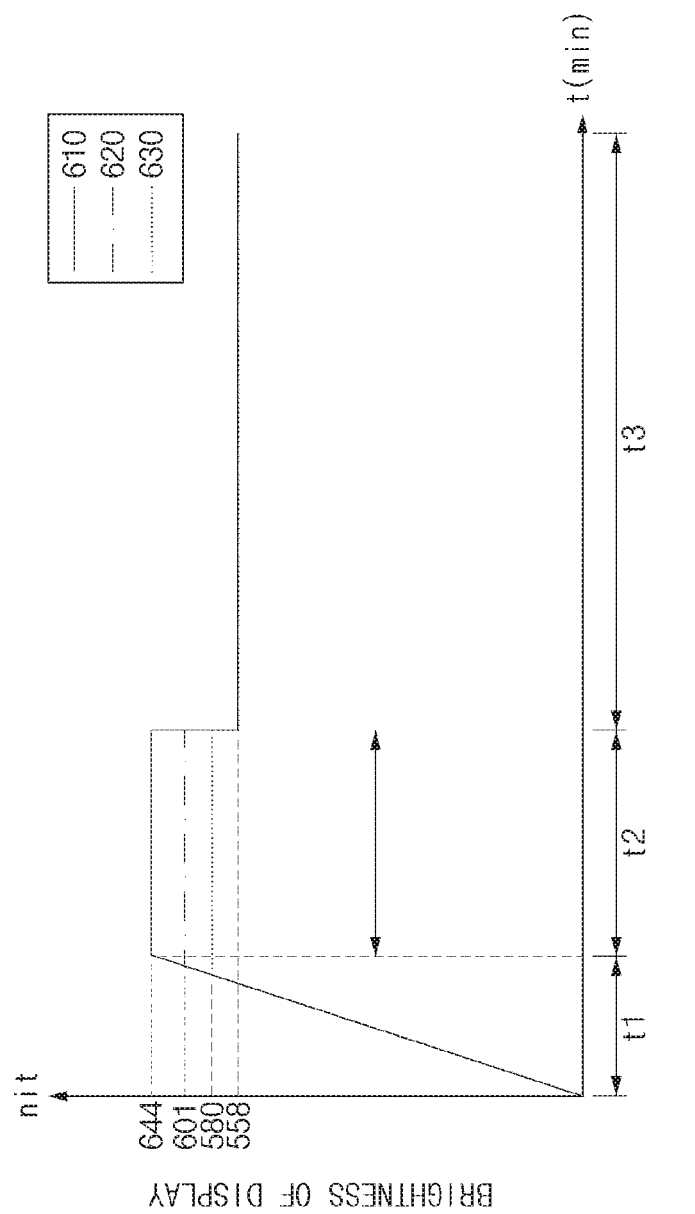
FIG. 6A illustrates brightness of a display, according to another embodiment.

FIG. 6A illustrates brightness of a display, according to another embodiment. FIG. 6A is a view associated with an embodiment to change the brightness of the display 120 based on an illuminance value and the driving time of the display 120. In FIG. 6A, in the case where an illuminance value is 100,000 lux, a graph 610 indicates the brightness of the display 120; in the case where the illuminance value is 60,000 lux, a graph 620 indicates the brightness of the display 120; and in the case where the illuminance value is 50,000 lux, a graph 630 indicates the brightness of the display 120.

Referring to FIG. 6A, the electronic device 100 may measure the illuminance value through the illuminance sensor 170. When the illuminance value is measured, the electronic device 100 may drive the display 120 with the brightness corresponding to the illuminance value. For example, when a user goes outdoors while gripping the electronic device 100, the electronic device 100 may measure the illuminance value through the illuminance sensor 170. In the case where the illuminance value is 100,000 lux, the electronic device 100 may gradually increase the brightness of the display 120 and then may control the display 120 such that the brightness of the display 120 becomes 644 nit at the maximum. Referring to the graph 610, the electronic device 100 may gradually increase the brightness of the display 120 during t1 and then may control the display 120 such that the brightness of the display 120 becomes 644 nit at the maximum.

The electronic device 100 may measure whether the display 120 is driven during a specified time or more at the maximum brightness. For example, in the case where the illuminance value is 100,000 lux, the electronic device 100 may measure whether the display 120 is driven at the brightness of 644 nit during section t2 (e.g., 10 minutes) or more. When the display 120 is driven during a specified time or more at the maximum brightness, the electronic device 100 may decrease the brightness of the display 120. For example, when the display 120 is driven at the brightness of 644 nit during section t2 or more, in section t3, the electronic device 100 may allow the display 120 to be driven at the brightness of 558 nit.

For another example, in the case where the illuminance value is 60,000 lux, the electronic device 100 may gradually increase the brightness of the display 120 and then may control the display 120 such that the brightness of the display 120 becomes 601 nit at the maximum. Referring to the graph 620, the electronic device 100 may gradually increase the brightness of the display 120 during t1 and then may control the display 120 such that the brightness of the display 120 becomes 601 nit at the maximum.

The electronic device 100 may measure whether the display 120 is driven during a specified time or more at the maximum brightness. For example, in the case where the illuminance value is 60,000 lux, the electronic device 100 may measure whether the display 120 is driven during t2 (e.g., 10 minutes) or more at the brightness of 601 nit. When the display 120 is driven during a specified time or more at the maximum brightness, the electronic device 100 may decrease the brightness of the display 120. For example, when the display 120 is driven at the brightness of 601 nit during section t2 or more, in section t3, the electronic device 100 may allow the display 120 to be driven at the brightness of 558 nit. In the present disclosure, details given in graph 610 and graph 620 may be applied to graph 630.

According to an embodiment of the present disclosure, in the case where the display 120 is driven at the maximum brightness during a specified time or more, the brightness of the display 120 may be reduced, thereby preventing a pixel included in the display 120 from deterioration.

Figure 6B:
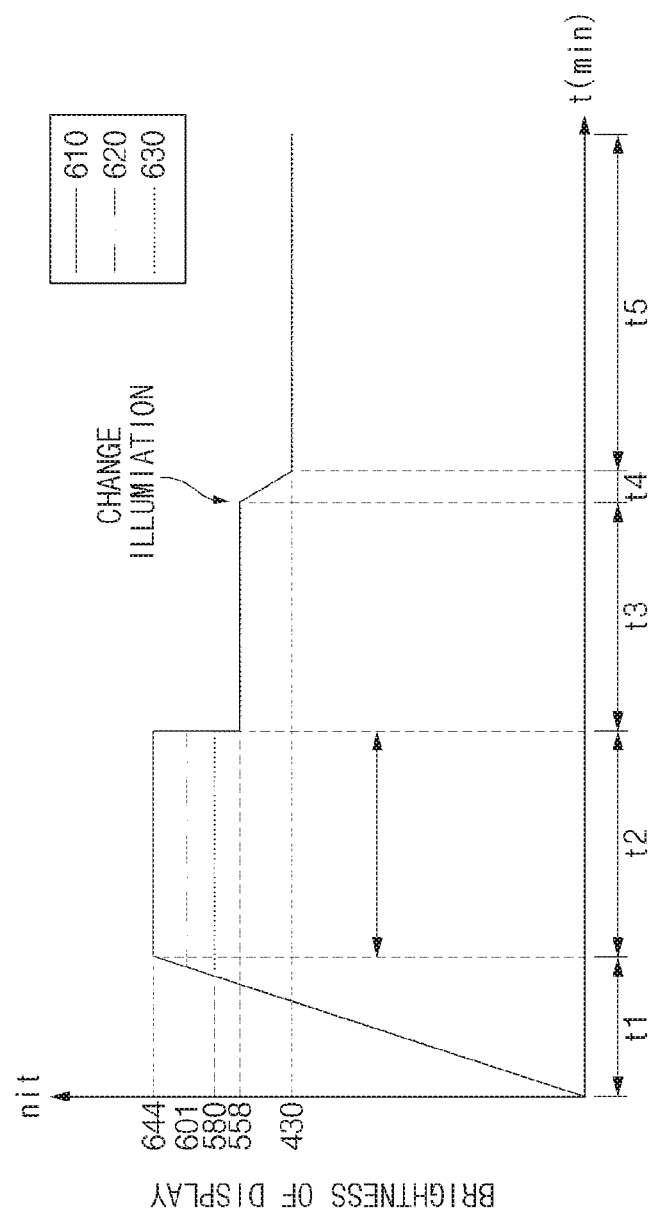
FIG. 6B illustrates brightness of a display, according to another embodiment.

FIG. 6B illustrates brightness of a display, according to another embodiment. FIG. 6B is a view associated with an embodiment to change the brightness of the display 120 as an illuminance value is changed. Details about sections t1 to t3 in FIG. 6A may be applied to FIG. 6B.

Referring to FIG. 6B, when an illuminance value is changed, the electronic device 100 may decrease the brightness of the display 120. For example, when a user comes indoors from the outside while gripping the electronic device 100, the electronic device 100 may decrease the brightness of the display 120. That is, when the illuminance value is changed from 100,000 lux (60,000 lux or 50,000 lux) to 3,000 lux, the electronic device 100 may decrease the brightness of the display 120 during section t4 until the brightness of the display 120 becomes 430 nit. When the brightness of the display 120 decreases, the electronic device 100 may maintain the brightness of the display 120 during section t5.

TABLE 2

| Illuminance (lux) | Initiation (nit) | After 10 minutes (nit) |
| --- | --- | --- |
| 3000 | 430 | 430 |
| 4000 | 451 | 451 |
| 5000 | 472 | 472 |
| 10000 | 494 | 494 |
| 20000 | 515 | 515 |
| 30000 | 536 | 536 |
| 40000 | 558 | 558 |
| 50000 | 580 | 558 |
| 60000 | 601 | 558 |
| 80000 | 622 | 558 |
| 100000 | 644 | 558 |

Sections t1 to t5 will be described with reference to Table 2 and FIG. 6B. The electronic device 100 may measure the illuminance value through the illuminance sensor 170. When the illuminance value is measured, the electronic device 100 may drive the display 120 with the brightness corresponding to the illuminance value. For example, in the case where the illuminance value is 100,000 lux, the electronic device 100 may gradually increase the brightness of the display 120 during section t1 and then may control the display 120 such that the brightness of the display 120 becomes 644 nit at the maximum.

The electronic device 100 may measure whether the display 120 is driven during a specified time or more at the maximum brightness. For example, when the illuminance value is not less than 50,000 lux and the display 120 is driven at the maximum brightness (e.g., 580 nit) during section t2 (e.g., 10 minutes) or more, the electronic device 100 may control the display 120 such that the brightness of the display 120 becomes 558 nit. The changed brightness (e.g., 558 nit) of the display 120 may be maintained until the illuminance value is changed (e.g., during section t3).

When an illuminance value is changed, the electronic device 100 may decrease the brightness of the display 120. For example, when a user comes indoors from the outside while gripping the electronic device 100, the electronic device 100 may decrease the brightness of the display 120. That is, when the illuminance value is changed from 50,000 lux to 3,000 lux, the electronic device 100 may decrease the brightness of the display 120 during section t4 until the brightness of the display 120 becomes 430 nit. When the brightness of the display 120 decreases, the electronic device 100 may maintain the brightness of the display 120 during section t5.

According to an embodiment, the increasing rate of the brightness of the display 120 during section t1 may be nearly similar to the decreasing rate of the brightness of the display 120 during section t4. That is, in FIG. 6B, the absolute value of a slope corresponding to section t1 may be nearly similar to the absolute value of a slope corresponding to section t4. According to an embodiment of the present disclosure, the display may be controlled such that the increasing rate of the brightness of the display 120 is nearly similar to the decreasing rate of the brightness of the display 120. Accordingly, a user may be provided with a screen with similar changes in brightness even though the illuminance value increases or decreases.

Meanwhile, embodiments described in FIGS. 6A and 6B and Table 2 may be only an example, and the embodiments of the present disclosure are not limited to details in FIGS. 6A and 6B and Table 2. For example, in the case where the display 120 is driven at 644 nit for 10 minutes or more in a state where the illuminance value is 100,000 lux, the electronic device 100 may decrease the brightness of the display 120 to 536 nit instead of 558 nit.

Figure 6C:
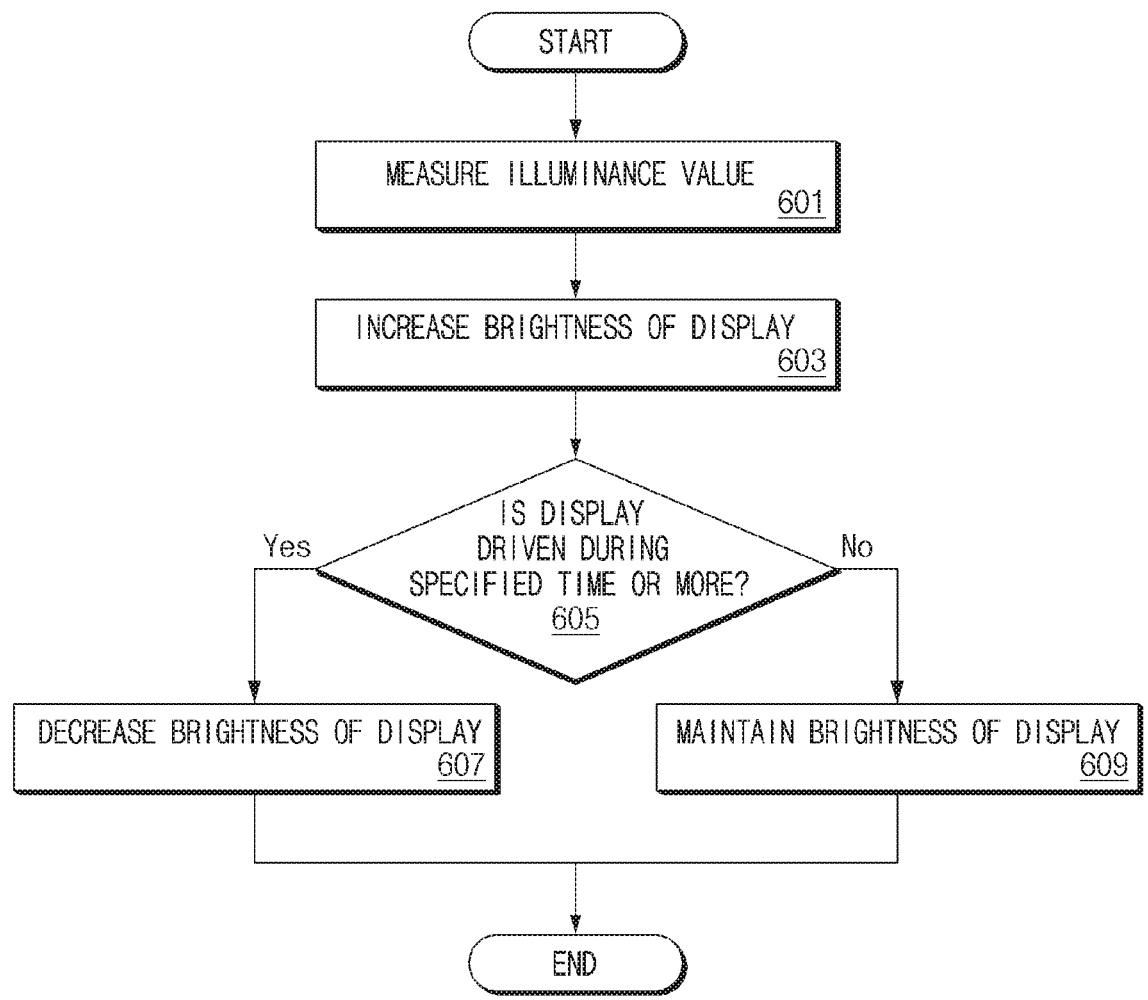
FIG. 6C illustrates an operation flowchart of an electronic device, according to another embodiment.

FIG. 6C illustrates an operation flowchart of an electronic device, according to another embodiment. FIG. 6C illustrates an operation flowchart of the electronic device 100 according to an embodiment illustrated in FIG. 6A.

Referring to FIG. 6C, in operation 601, the electronic device 148 may measure an illuminance value through the illuminance sensor 170. For example, when a user goes outdoors while gripping the electronic device 100, the processor 148 may measure the illuminance value through the illuminance sensor 170. In another embodiment, the processor 148 may measure the illuminance value at a specified period (e.g., 10 seconds).

In operation 603, the electronic device 100 may adjust the brightness of the display 120 to a brightness corresponding to the illuminance value. For example, in the case where the illuminance value is 50,000 lux, the electronic device 100 may gradually increase the brightness of the display 120 and then may control the display 120 such that the brightness of the display 120 becomes 580 nit at the maximum.

In operation 605, the electronic device 100 may measure whether the display 120 is driven during a specified time or more at the maximum brightness. For example, in the case where the illuminance value is 50,000 lux, the electronic device 100 may measure whether the display 120 is driven at the brightness of 580 nit for 10 minutes or more.

When the display 120 is driven during a specified time or more at the maximum brightness, in operation 607, the electronic device 100 may decrease the brightness of the display 120. For example, when the display 120 is driven at the brightness of 580 nit for 10 minutes or more, the electronic device 100 may decrease the brightness of the display 120 to 558 nit.

When the display 120 is not driven during a specified time or more at the maximum brightness, in operation 609, the electronic device 100 may maintain the brightness of the display 120. For example, when the display 120 is driven at the brightness of 580 nit for 5 minutes, the brightness of the display 120 may be maintained to 580 nit.

According to an embodiment of the present disclosure, in the case where the display 120 is driven at the maximum brightness during a specified time or more, the brightness of the display 120 may be reduced, thereby preventing a pixel included in the display 120 from deterioration.

Figure 7:
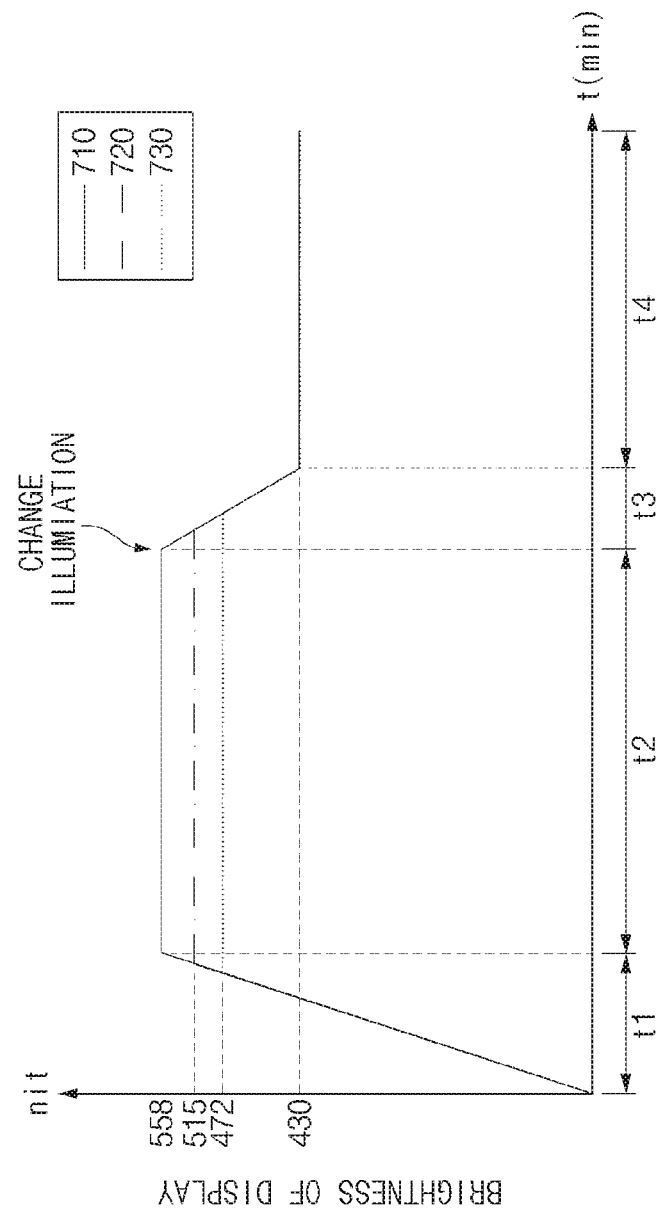
FIG. 7 illustrates brightness of a display, according to another embodiment.

FIG. 7 illustrates brightness of a display, according to another embodiment.

The embodiment illustrated in FIGS. 6A and 6B is associated with an embodiment to adjust the brightness of the display 120 in the case where an illuminance value is not less than 50,000 lux. Hereinafter, an embodiment to be described in FIG. 7 is associated with an embodiment to adjust the brightness of the display 120 in the case where the illuminance value is not greater than 40,000 lux. In FIG. 7, in the case where an illuminance value is 40,000 lux, a graph 710 indicates the brightness of the display 120; in the case where the illuminance value is 20,000 lux, a graph 720 indicates the brightness of the display 120; and in the case where the illuminance value is 5,000 lux, a graph 730 indicates the brightness of the display 120.

Referring to FIG. 7, the electronic device 100 may measure the illuminance value through the illuminance sensor 170. When the illuminance value is measured, the electronic device 100 may drive the display 120 with the brightness corresponding to the illuminance value. For example, in the case where the illuminance value is 40,000 lux, the electronic device 100 may gradually increase the brightness of the display 120 and then may control the display 120 such that the brightness of the display 120 becomes 558 nit at the maximum. Referring to the graph 710, the electronic device 100 may gradually increase the brightness of the display 120 during t1 and then may control the display 120 such that the brightness of the display 120 becomes 558 nit at the maximum.

When an illuminance value is changed, the electronic device 100 may decrease the brightness of the display 120. For example, until the illuminance value is changed (e.g., during section t2) in a state where the illuminance value is 40,000 lux, the electronic device 100 may maintain the brightness of the display 120 to 558 nit. That is, when the illuminance value is changed to 3,000 lux in a state where the brightness of the display 120 is maintained, the electronic device 100 may decrease the brightness of the display 120 during section t3 until the brightness of the display 120 becomes 430 nit. When the brightness of the display 120 decreases, the electronic device 100 may maintain the brightness of the display 120 during section t4.

According to an embodiment, the increasing rate of the brightness of the display 120 during section t1 may be nearly similar to the decreasing rate of the brightness of the display 120 during section t3. That is, in FIG. 7, the absolute value of a slope corresponding to section t1 may be nearly similar to the absolute value of a slope corresponding to section t3. According to an embodiment of the present disclosure, the display may be controlled such that the increasing rate of the brightness of the display 120 is nearly similar to the decreasing rate of the brightness of the display 120. Accordingly, a user may be provided with a screen with similar changes in brightness even though the illuminance value increases or decreases.

For another example, in the case where the illuminance value is 20,000 lux, the electronic device 100 may gradually increase the brightness of the display 120 and then may control the display 120 such that the brightness of the display 120 becomes 515 nit at the maximum. Referring to the graph 720, the electronic device 100 may gradually increase the brightness of the display 120 during t1 and then may control the display 120 such that the brightness of the display 120 becomes 515 nit at the maximum.

When an illuminance value is changed, the electronic device 100 may decrease the brightness of the display 120. For example, until the illuminance value is changed (e.g., during section t2) in a state where the illuminance value is 20,000 lux, the electronic device 100 may maintain the brightness of the display 120 to 515 nit. That is, when the illuminance value is changed to 3,000 lux in a state where the brightness of the display 120 is maintained, the electronic device 100 may decrease the brightness of the display 120 during section t3 until the brightness of the display 120 becomes 430 nit. When the brightness of the display 120 decreases, the electronic device 100 may maintain the brightness of the display 120 during section t4. In the present disclosure, details given in graph 710 and graph 720 may be applied to graph 730.

According to an embodiment of the present disclosure, when the illuminance value is changed, the brightness of the display 120 may be reduced, thereby preventing a pixel included in the display 120 from deterioration.

Figure 8:
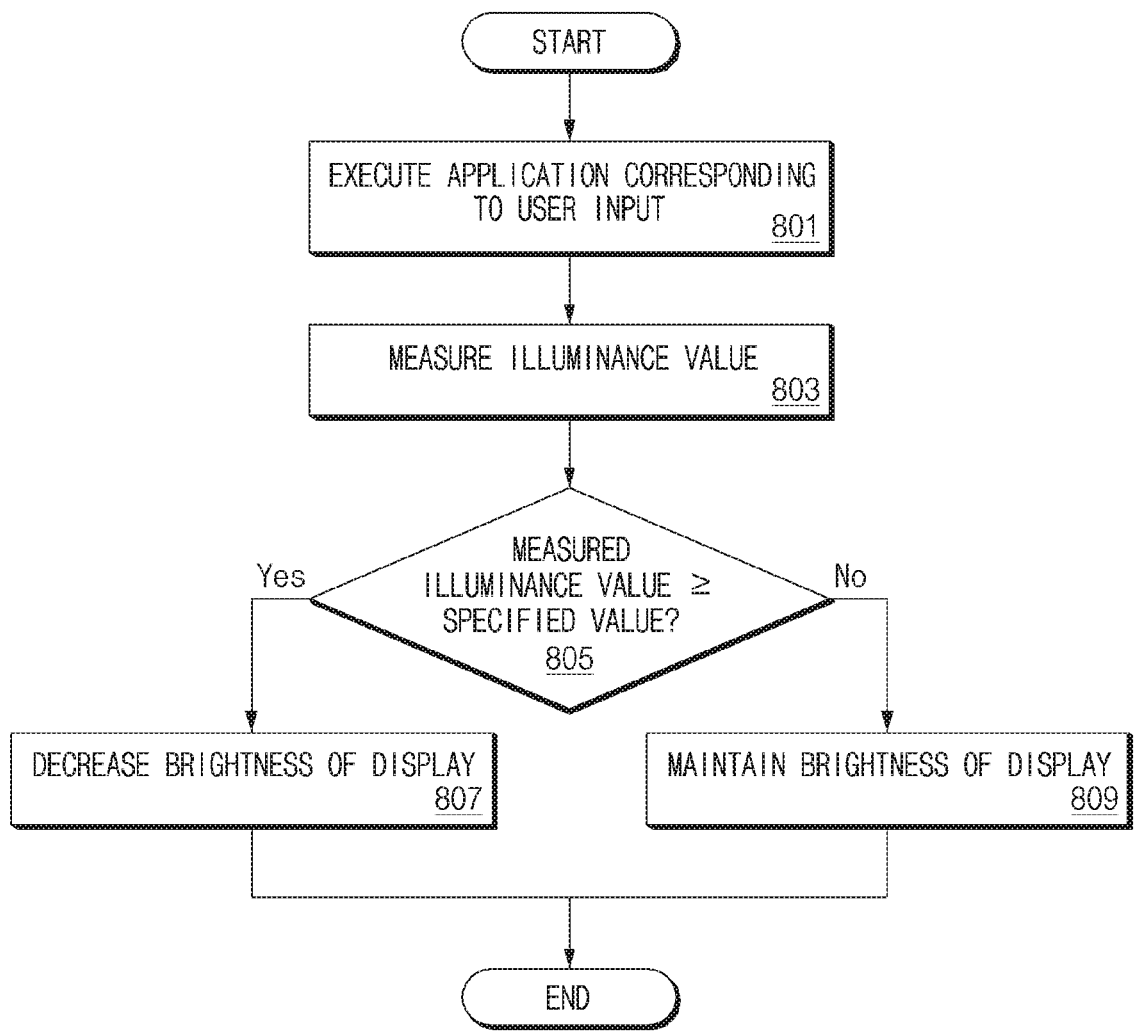
FIG. 8 illustrates an operation flowchart of an electronic device, according to another embodiment.

FIG. 8 illustrates an operation flowchart of an electronic device, according to another embodiment.

Referring to FIG. 8, in operation 801, the electronic device 100 may execute an application in response to a user input. The application executed in operation 801 may be included in the specified application described in operation 205. For example, the executed application may include at least one of Facebook messenger, KakaoTalk, Google, Naver, YouTube, or the like.

In operation 803, the electronic device 100 may measure an illuminance value through the illuminance sensor 170. For example, in the case where the electronic device 100 is positioned outdoors, the illuminance value may have a great value (e.g., 100,000 lux); in the case where the electronic device 100 is positioned indoors, the illuminance value may have a small value (e.g., 30,000 lux).

In operation 805, the electronic device 100 may compare the measured illuminance value with a specified value (e.g., 40,000 lux). When the measured illuminance value is greater than the specified value, the electronic device 100 may perform operation 807; when the measured illuminance value is less than the specified value, the electronic device 100 may perform operation 809.

In operation 807, the electronic device 100 may decrease the brightness of the display 120. For example, when the measured illuminance value is greater than the specified value, the brightness of the display 120 may have a great value in proportion to the measured illuminance value. When a specified application is executed in a state where the display 120 is very bright, the possibility of pixel deterioration may increase. Accordingly, the electronic device 100 may decrease the brightness of the display 120.

In operation 809, the electronic device 100 may maintain the brightness of the display 120. For example, when the measured illuminance value is less than the specified value, the brightness of the display 120 may have a small value in proportion to the measured illuminance value. When the display 120 is somewhat dark, the possibility of pixel deterioration may decrease. Accordingly, the electronic device 100 may maintain the brightness of the display 120.

According to an embodiment of the present disclosure, the brightness of the display 120 may be reduced based on the executed application and the illuminance value, thereby preventing a pixel included in the display 120 from deterioration.

Figure 9:
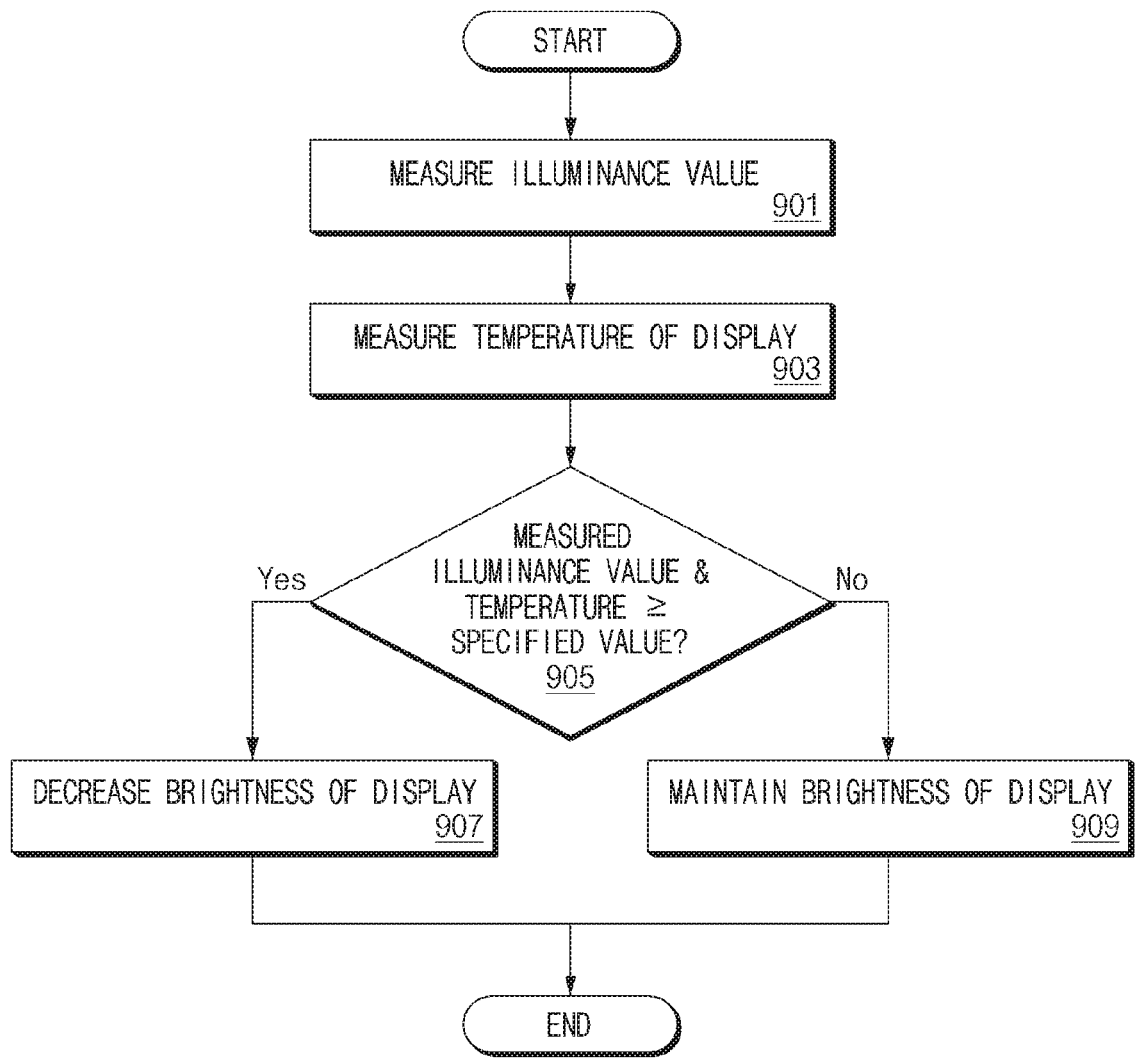
FIG. 9 illustrates an operation flowchart of an electronic device, according to another embodiment.

FIG. 9 illustrates an operation flowchart of an electronic device, according to another embodiment.

Referring to FIG. 9, the electronic device 100 may measure an illuminance value through the illuminance sensor 170. For example, in the case where the electronic device 100 is positioned outdoors, the illuminance value may have a great value (e.g., 100,000 lux); in the case where the electronic device 100 is positioned indoors, the illuminance value may have a small value (e.g., 30,000 lux).

In operation 903, the electronic device 100 may measure the temperature of the display 120. In the present disclosure, details given in operation 207 may be applied to operation 903. Meanwhile, an embodiment in FIG. 9 is exemplified as the electronic device 100 measures the temperature of the display 120 after measuring the illuminance value. However, the electronic device 100 may measure the illuminance value after measuring the temperature of the display 120. In addition, the electronic device 100 may measure the temperature of the display 120 and the illuminance value at the same time.

In operation 905, the electronic device 100 may determine whether the measured illuminance value and the temperature of the display 120 are not less than a specified value (e.g., 40,000 lux, 50° C.). When the measured illuminance value or the measured temperature is greater than the specified value, the electronic device 100 may perform operation 907; when the measured illuminance value or the measured temperature is less than the specified value, the electronic device 100 may perform operation 909.

In operation 907, the electronic device 100 may decrease the brightness of the display 120. For example, when the measured illuminance value or the measured temperature is greater than the specified value, the brightness of the display 120 may have a great value in proportion to the measured illuminance value. When the temperature of the display 120 is high in a state where the display 120 is very bright, the possibility of pixel deterioration may increase. Accordingly, the electronic device 100 may decrease the brightness of the display 120.

In operation 909, the electronic device 100 may maintain the brightness of the display 120. For example, when the measured illuminance value is less than the specified value, the brightness of the display 120 may have a small value in proportion to the measured illuminance value. When the display 120 is somewhat dark, the possibility of pixel deterioration may decrease. Accordingly, the electronic device 100 may maintain the brightness of the display 120. In the meantime, when the measured temperature is less than the specified value, the driving time of the display 120 may be very short. When the driving time of the display 120 is very short, the possibility of pixel deterioration may decrease. Accordingly, the electronic device 100 may maintain the brightness of the display 120.

According to an embodiment of the present disclosure, the brightness of the display 120 may be reduced based on the illuminance value and the temperature of the display 120, thereby preventing a pixel included in the display 120 from deterioration.

Figure 10:
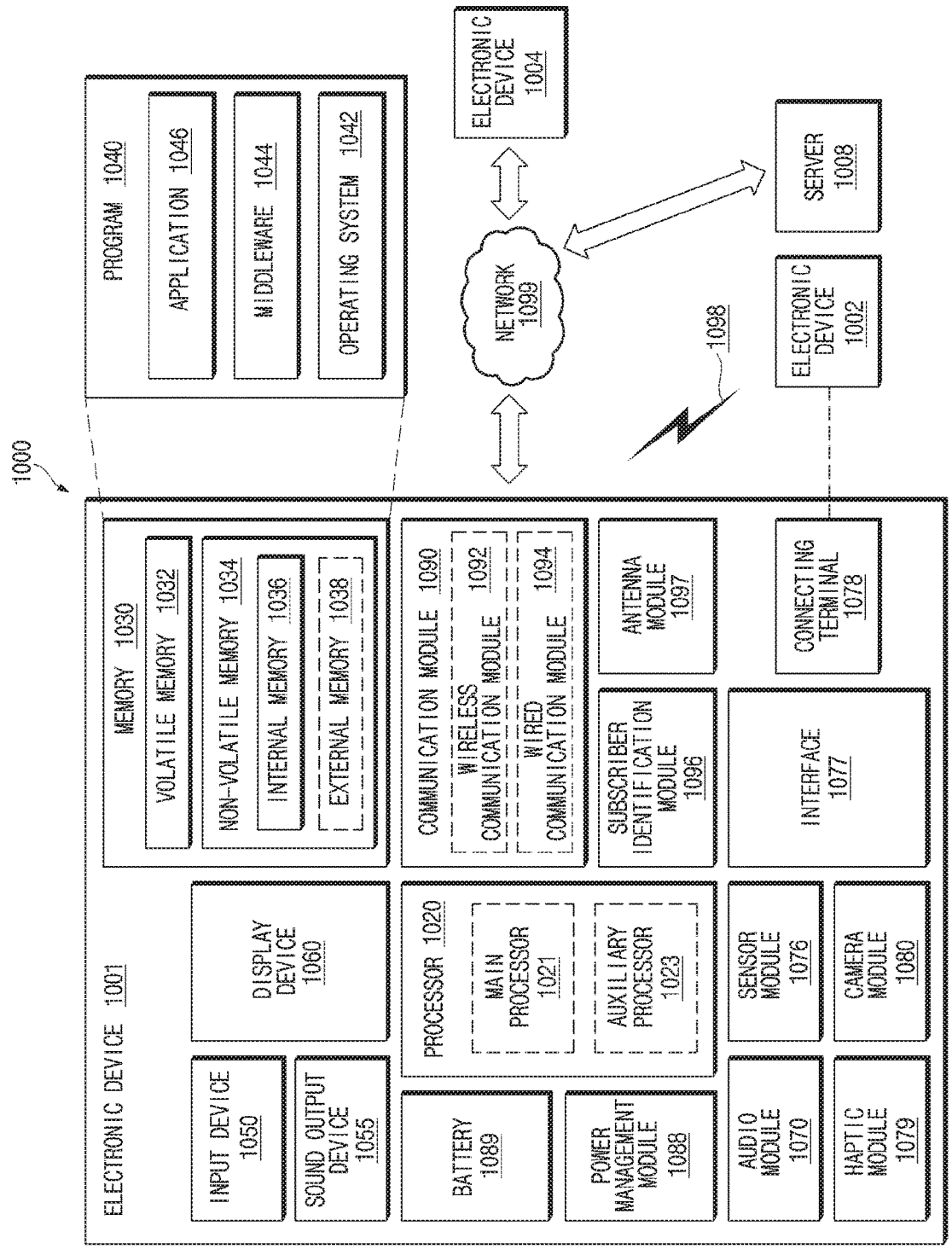
FIG. 10 is a block diagram of an electronic device in a network environment, according to various embodiments.

FIG. 10 is a block diagram of an electronic device in a network environment according to various embodiments.

Referring to FIG. 10, an electronic device 1001 may communicate with an electronic device 1002 through a first network 1098 (e.g., a short-range wireless communication network) or may communicate with an electronic device 1004 or a server 1008 through a second network 1099 (e.g., a long-distance wireless communication network) in a network environment 1000. According to an embodiment, the electronic device 1001 may communicate with the electronic device 1004 through the server 1008. According to an embodiment, the electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module 1096, and an antenna module 1097. According to some embodiments, at least one (e.g., the display device 1060 or the camera module 1080) among components of the electronic device 1001 may be omitted or at least one or more other components may be added to the electronic device 1001. According to some embodiments, some components may be implemented as an integrated circuit. For example, the sensor module 1076 (e.g., a fingerprint sensor, an iris sensor, or an illuminance sensor) may be embedded and implemented in the display device 1060 (e.g., a display).

The processor 1020 may execute, for example, software (e.g., a program 1040) to control at least one of other components (e.g., a hardware or software component) of the electronic device 1001 connected to the processor 1020 and may process or compute a variety of data. According to an embodiment, as a part of the data processing and the computation, the processor 1020 may load a command set or data, which is received from other components (e.g., the sensor module 1076 or the communication module 1090), into a volatile memory 1032, may process the command or data stored in the volatile memory 1032, and may store result data into a nonvolatile memory 1034. According to an embodiment, the processor 1020 may include a main processor 1021 (e.g., a central processing unit or an application processor) and an auxiliary processor 1023 (e.g., a graphic processing device, an image signal processor, a sensor hub processor, or a communication processor), which operates independently from the main processor 1021 or operates together with the main processor 1021. Additionally or alternatively, the auxiliary processor 1023 may use less power than the main processor 1021, or is specified to a designated function. In this case, the auxiliary processor 1023 may operate separately from the main processor 1021 or as a part of the main processor 1021.

The auxiliary processor 1023 may control, for example, at least some of functions or states associated with at least one component (e.g., the display device 1060, the sensor module 1076, or the communication module 1090) among the components of the electronic device 1001 instead of the main processor 1021 while the main processor 1021 is in an inactive (e.g., sleep) state or together with the main processor 1021 while the main processor 1021 is in an active (e.g., an application execution) state. According to an embodiment, the auxiliary processor 1023 (e.g., the image signal processor or the communication processor) may be implemented as a part of another component (e.g., the camera module 1080 or the communication module 1090) that is functionally related to the auxiliary processor 1023.

The memory 1030 may store a variety of data used by at least one component (e.g., the processor 1020 or the sensor module 1076) of the electronic device 1001. The data may include, for example, software (e.g., the program 1040) and input data or output data with respect to commands associated with the software. The memory 1030 may include the volatile memory 1032 or the nonvolatile memory 1034.

The program 1040 may be stored in the memory 1030 as software and may include, for example, an operating system 1042, a middleware 1044, or an application 1046.

The input device 1050 may receive a command or data, which is used for a component (e.g., the processor 1020) of the electronic device 1001, from an outside (e.g., a user) of the electronic device 1001. The input device 1050 may include, for example, a microphone, a mouse, or a keyboard.

The sound output device 1055 may output a sound signal to the outside of the electronic device 1001. The sound output device 1055 may include, for example, a speaker or a receiver. The speaker may be used for general purposes, such as multimedia play or recordings play, and a receiver may be used for receiving calls. According to an embodiment, the receiver and the speaker may be either integrally or separately implemented.

The display device 1060 may visually provide information to the user and may include. The display device 1060 may include, for example, a display, a hologram device, or a projector and a control circuit for controlling a corresponding device. According to an embodiment, the display device 1060 may include a touch circuitry configured to sense a touch or a sensor circuitry (e.g., a pressure sensor) for measuring an intensity of force generated by the touch.

The audio module 1070 may convert a sound to an electrical signal, or in contrast, may convert an electrical signal to a sound. According to an embodiment, the audio module 1070 may obtain the sound through the input device 1050 or may output the sound through an external electronic device (e.g., the electronic device 1002 (e.g., a speaker or a headphone)) directly or wirelessly connected to the sound output device 1055 or the electronic device 1001.

The sensor module 1076 may generate an electrical signal or a data value corresponding to an operating state (e.g., power or temperature) of the electronic device 1001 or an environmental state (e.g., a user state) outside the electronic device 1001. According to an embodiment, the sensor module 1076 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1077 may support one or more designated protocols such that the electronic device 1001 is directly or wirelessly connected to the external electronic device (e.g., the electronic device 1002). According to an embodiment, the interface 1077 may include, for example, an HDMI (high-definition multimedia interface), a USB (universal serial bus) interface, an SD card interface, or an audio interface.

A connecting terminal 1078 may include a connector that physically connects the electronic device 1001 to the external electronic device (e.g., the electronic device 1002) through the connecting terminal 1078. According to an embodiment, the connecting terminal 1078 may include, for example, an HDMI connector, a USB connector, an SD card connector, or an audio connector (e.g., a headphone connector).

The haptic module 1079 may convert an electrical signal to a mechanical stimulation (e.g., vibration or movement) or an electrical stimulation perceived by the user through tactile or kinesthetic sensations. According to an embodiment, the haptic module 1079 may include, for example, a motor, a piezoelectric element, or an electric stimulator.

The camera module 1080 may shoot a still image or a video image. According to an embodiment, the camera module 1080 may include, for example, at least one or more lenses, image sensors, image signal processors, or flashes.

The power management module 1088 may manage power supplied to the electronic device 1001. According to an embodiment, the power management module 1088 may serve as at least a part of a power management integrated circuit (PMIC).

The battery 1089 may supply power to at least one component of the electronic device 1001. According to an embodiment, the battery 1089 may include, for example, a non-rechargeable (primary) battery, a rechargeable (secondary) battery, or a fuel cell.

The communication module 1090 may establish a direct (e.g., wired) communication channel or a wireless communication channel between the electronic device 1001 and the external electronic device (e.g., the electronic device 1002, the electronic device 1004, or the server 1008) and support communication execution through the established communication channel. The communication module 1090 may operate independently from the processor 1020 (e.g., the application processor) and may include at least one communication processor supporting the direct (e.g., wired) communication or the wireless communication. According to an embodiment, the communication module 1090 may include a wireless communication module 1092 (e.g., a cellular communication module, a short-range wireless communication module, or a GNSS (global navigation satellite system) communication module) or a wired communication module 1094 (e.g., an LAN (local area network) communication module or a power line communication module). The corresponding communication module among the communication modules may communicate with the external electronic device through the first network 1098 (e.g., the short-range communication network such as a Bluetooth, a WiFi direct, or an IrDA (infrared data association)) or the second network 1099 (e.g., the long-distance wireless communication network such as a cellular network, an internet, or a computer network (e.g., LAN or WAN)). The above-mentioned various communication modules may be implemented into one chip or may be implemented with a plurality of separate components (e.g., a plurality of chips), respectively. According to an embodiment, the wireless communication module 1092 may identify and authenticate the electronic device 1001 using user information (e.g., international mobile subscriber identity (IMSI)) stored in the subscriber identification module 1096 in the communication network, such as the first network 1098 or the second network 1099.

The antenna module 1097 may transmit or receive the signal or power to or from the outside (e.g., an external electronic device). According to an embodiment, the antenna module 1097 may include one or more antennas, and the communication module 1090 may select at least one antenna suitable for the communication scheme used in the communication network such as the first network 1098 or the second network 1099. The signal or power may be transmitted or received between the communication module 1090 and the external electronic device through the selected at least one antenna.

Some components among the components may be connected to each other through a communication method (e.g., a bus, a GPIO (general purpose input and output), an SPI (serial peripheral interface), or an MIPI (mobile industry processor interface)) used between peripheral devices and may exchange signals (e.g., a command or data) with each other.

According to an embodiment, the command or data may be transmitted or received between the electronic device 1001 and the external electronic device 1004 through the server 1008 connected to the second network 1099. Each of the electronic devices 1002 and 1004 may be the same or different types as or from the electronic device 1001. According to an embodiment, all or some of the operations performed by the electronic device 1001 may be performed by one or more external devices among the external electronic devices 1002, 1004, and 1008. When the electronic device 1001 performs some functions or services automatically or by request of the user or another device, the electronic device 1001 may request one or more external electronic devices to perform at least some of the functions related to the functions or services, in addition to or instead of performing the functions or services by itself. The one or more external electronic devices receiving the request may carry out at least a part of the requested function or a service, or the additional function or service associated with the request and transmit the result to the electronic device 1001. The electronic device 1001 may provide the result as is or after additionally processing the result as at least a part of response to the request. To this end, for example, a cloud computing, distributed computing, or client-server computing technology may be used.

Figure 11:
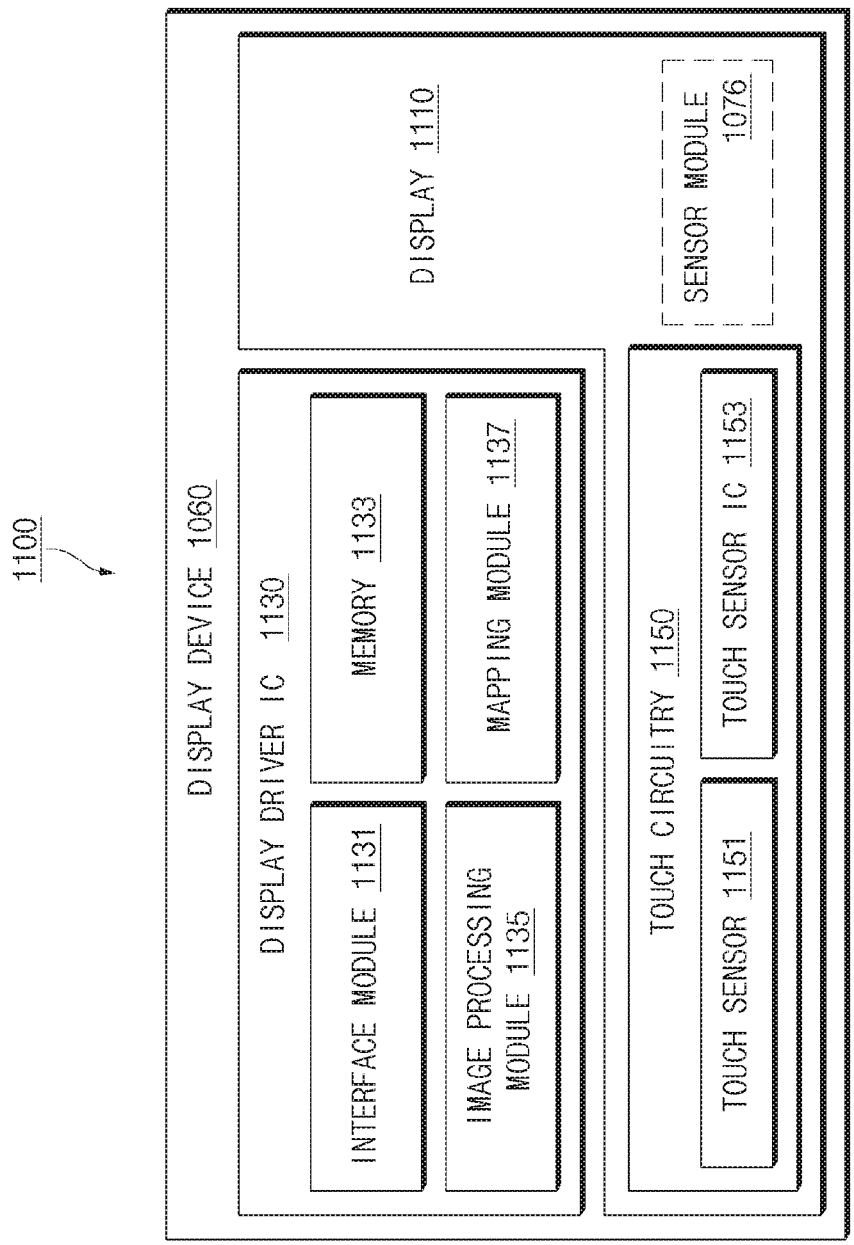
FIG. 11 is a block diagram of a display device, according to various embodiments.

FIG. 11 is a block diagram of a display device, according to various embodiments.

Referring to FIG. 11, the display device 1060 may include a display 1110 and a display driver IC (DDI) 1130 for controlling the display 1110. The DDI 1130 may include an interface module 1131, a memory 1133 (e.g., a buffer memory), an image processing module 1135, or a mapping module 1137. For example, the DDI 1130 may receive image information including image data or an image control signal corresponding to a command for controlling the image data from another component of an electronic device 1001. For example, according to an embodiment, the image information may be received from the processor 1020 (e.g., the main processor 1021) (e.g., an application processor) or the auxiliary processor 1023 (e.g., a graphic processing display) that operates independently of the function of the main processor 1021. The DDI 1130 may communicate with a touch circuitry 1150, the sensor module 1076, or the like through the interface module 1131. In addition, the DDI 1130 may store at least part of the received image information in the memory 1133, for example, in units of frames. For example, the image processing module 1135 may perform pre-processing or post-processing (e.g., adjustment of resolution, brightness, or size) on at least part of the image data based at least on characteristics of the image data or the display 1110. The mapping module 1137 may generate a voltage value or a current value corresponding to the image data that is pre-processed or post-processed through the image processing module 1135. According to an embodiment, for example, the generation of the voltage value or the current value may be performed based at least partly on attributes (e.g., an array of pixels (RGB stripe or pentile) or a size of each of sub-pixels). For example, at least some pixels of the display 1110 may be driven based at least partly on the voltage or current value, such that visual information (e.g., a text, an image, or an icon) corresponding to the image data may be displayed through the display 1110.

According to an embodiment, the display device 1060 may further include the touch circuitry 1150. The touch circuitry 1150 may include a touch sensor 1151 and a touch sensor IC 1153 for controlling the touch sensor 1151. For example, the touch sensor IC 1153 may control the touch sensor 1151 to sense a touch input or a hovering input at a specific location of the display 1110. For example, the touch sensor IC 1153 may measure a change in a signal (e.g., a voltage, a light amount, a resistance, or a charge amount) at a specific location of the display 1110 to sense the touch input or the hovering input. The touch sensor IC 1153 may provide the processor 1020 with information (e.g., a location, an area, a pressure or a time) about the sensed touch input or hovering input. According to an embodiment, at least part (e.g., the touch sensor IC 1153) of the touch circuitry 1150 may be included as a part of the display driver IC 1130 or the display 1110, or as a part of another component (e.g., the auxiliary processor 1023) arranged outside the display device 1060.

According to an embodiment, the display device 1060 may further include at least one sensor (e.g., a fingerprint sensor, an iris sensor, a pressure sensor or an illuminance sensor) of the sensor module 1076, or a control circuit thereof. In this case, the at least one sensor or the control circuit thereof may be embedded in a part (e.g., the display 1110 or the DDI 1130) of the display device 1060 or in a part of the touch circuitry 1150. For example, in the case where the sensor module 1076 embedded in the display device 1060 includes a biometric sensor (e.g., a fingerprint sensor), the biometric sensor may obtain biometric information (e.g., a fingerprint image) associated with a touch input through the partial area of the display 1110. For another example, in the case where the sensor module 1076 embedded in the display device 1060 includes a pressure sensor, the pressure sensor may obtain pressure information associated with a touch input through the partial area or the whole area of the display 1110. According to an embodiment, the touch sensor 1151 or the sensor module 1076 may be interposed between pixels of the pixel layer of the display 1110 or may be disposed above or below the pixel layer.

The electronic device according to various embodiments disclosed in the present disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technical features disclosed in the present disclosure to the particular forms disclosed herein; rather, the present disclosure should be construed to cover various modifications, equivalents, or alternatives of embodiments of the present disclosure. With regard to description of drawings, similar or related components may be assigned with similar reference numerals. As used herein, singular form of noun corresponding to an item may include one item or a plurality of items unless the context clearly indicates otherwise. In the present disclosure disclosed herein, each of the expressions "A or B", "at least one of A and B", "at least one of A or B", "A, B, or C", "one or more of A, B, and C", and "one or more of A, B, or C" may include any and all combinations of one or more of the associated listed items. The expressions "a first", "a second", "the first", or "the second", used in herein, may be merely used to distinguish a component from the other components and do not limit the corresponding components to other aspects (e.g., importance or order). It should be understood that when a component (e.g., a first component) is referred to as being "connected," or "coupled," to another component (e.g., a second component) with or without the terms such as "operatively" or "communicatively", the component may be directly (e.g., wired) or wirelessly connected or coupled to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. According to an embodiment, the "module" may be implemented with an application-specific integrated circuit (ASIC).

Various embodiments of the present disclosure may be implemented by software (e.g., the program 1040) including one or more instructions stored in a machine-readable storage media (e.g., an internal memory 1036 or an external memory 1038) readable by a machine (e.g., the electronic device 1001). For example, a processor (e.g., the processor 1020) of the machine (e.g., the electronic device 1001) may call at least one instruction among one or more instructions stored in the storage medium and may execute the instruction. This means that the machine is to be operated to perform at least one function in accordance with the at least one instruction being called. The one or more instructions may include a code generated by a compiler or a code executed by an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed (e.g., download or upload) through an application store (e.g., a Play Store™) or between two user devices (e.g., smartphones) directly or through on-line. In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one entity or a plurality of entities. According to various embodiments, one ore mode components among the above-described components or operations may be omitted, or one or more other components or operations may be added. Alternatively or additionally, some components (e.g., the module or the program) may be integrated in one component. In this case, the integrated component may perform the same or similar one or more functions of each component of the plurality of components performed by each corresponding components among the plurality of components prior to the integration. According to various embodiments, operations performed by a module, a programming, or other components disclosure may be executed sequentially, in parallel, repeatedly, or in a heuristic method. Also, at least some operations may be executed in different sequences, omitted, or other operations may be added.

What is claimed is:

1. An electronic device comprising:
   a housing surrounding a first surface, a second surface opposite to the first surface, and a space between the first surface and the second surface;
   a display viewable through the first surface and including a plurality of pixels;
   a memory configured to store applications output through the display and first data comprising application identifiers for identifying one or more applications of the stored applications as a specified application of a type which, when executed, outputs for display on the display a screen including an image of a specified type;
a sensor; and
a processor electrically connected to the display, the memory, and the sensor,
wherein the processor is configured to:
execute one of the applications in response to a user input;
determine whether the executed application is the specified application by comparing an application identifier of the executed application and the application identifiers of the first data;
based on determining that the application identifier of the executed application corresponds to one of the application identifiers of the first data, control the sensor to measure second data associated with a condition of the display; and
control to adjust a brightness of each of the pixels corresponding to a partial area of the display on which the image of the specified type is displayed based on the measured second data, while maintaining a brightness of each of the pixels corresponding to a remaining area of the display other than the partial area of the display on which the image of the specified type is displayed regardless of the measured second data.

2. The electronic device of claim 1, wherein the processor is configured to:
control the sensor to measure at least one of a temperature of the display or a driving time of the display.

3. The electronic device of claim 2, wherein the processor is configured to:
based on the temperature of the display being not less than a specified value, control to decrease the brightness of each of the pixels.

4. The electronic device of claim 2, wherein the processor is configured to:
based on the driving time of the display being not less than a specified time, control to decrease the brightness of each of the pixels.

5. The electronic device of claim 1, wherein the specified application comprises applications of a first type which, when executed, output for display on the display a screen including a fixed image, and
wherein remaining applications of the applications stored in the memory other than the first type applications correspond to second type applications.

6. The electronic device of claim 1, wherein the processor is configured to:
control to decrease the brightness of each of the pixels based on the measured second data, and
based on the executed application being terminated, control to increase the brightness of each of the pixels.

7. The electronic device of claim 1, further comprising:
an illuminance sensor exposed through at least part of the display, and
wherein the processor is configured to:
control to measure a first illuminance value through the illuminance sensor;
control to increase a brightness of the display to provide a first brightness corresponding to the measured first illuminance value; and
based on the display being driven with the first brightness during a specified time or more, decrease the brightness of the display to a second brightness darker than the first brightness.

8. The electronic device of claim 7, wherein the processor is configured to:
based on a second illuminance value lower than the first illuminance value being measured through the illuminance sensor, control to decrease the brightness of the display to a third brightness darker than the second brightness.

9. The electronic device of claim 7, wherein the processor is configured to:
control to maintain the brightness of the display at the first brightness during the specified time.

10. An electronic device comprising:
a housing surrounding a first surface, a second surface opposite to the first surface, and a space between the first surface and the second surface;
a display viewable through the first surface and including a plurality of pixels;
a sensor; and
a processor electrically connected to the display and the sensor,
wherein the processor is configured to:
compare a plurality of screens output through the display;
determine a partial area of the display on which a fixed image is displayed, based on the comparing;
based on determining the partial area of the display on which the fixed image is displayed, control the sensor to measure data associated with a condition of the display; and
control to adjust a brightness of each of pixels corresponding to the partial area of the display on which the fixed image is displayed, based on the measured data, while maintaining a brightness of each of the pixels corresponding to a remaining area of the display other than the partial area of the display on which the fixed image is displayed regardless of the measured data.

11. The electronic device of claim 10, further comprising:
a memory configured to store applications output through the display.

12. The electronic device of claim 11, wherein the processor is configured to:
execute one of the applications based on a user input; and
determine whether the partial area is present on a screen on which the executed application is output.

13. The electronic device of claim 10, wherein the processor is configured to:
control the sensor to measure at least one of a temperature of the display or a driving time of the display.

* * * * *